United States Patent [19]

Kawano et al.

[11] Patent Number: 5,511,167
[45] Date of Patent: Apr. 23, 1996

[54] PROGRAM PROCESSING METHOD AND APPARATUS FOR PRODUCING A DATA FLOW TYPE PROGRAM

[75] Inventors: Katsumi Kawano, Kawasaki; Kinji Mori, Machida; Yasuo Suzuki, Ebina; Masayuki Orimo, Kawasaki; Hirokazu Kasashima, Hitachi; Kozo Nakai, Katsuta, all of Japan

[73] Assignee: Hitachi, Ltd., Tokyo, Japan

[21] Appl. No.: 655,145

[22] Filed: Feb. 14, 1991

[30] Foreign Application Priority Data

Feb. 15, 1990 [JP] Japan .................................. 2-34712
Mar. 19, 1990 [JP] Japan .................................. 2-69424

[51] Int. Cl.$^6$ ........................... G06F 15/16; G06F 9/445
[52] U.S. Cl. .................... 395/200.03; 395/375; 395/700; 364/DIG. 1
[58] Field of Search ................................. 395/700, 800, 395/375, 200.03, 650

[56] References Cited

U.S. PATENT DOCUMENTS

| | | | |
|---|---|---|---|
| 4,841,436 | 6/1989 | Asano et al. | 395/250 |
| 4,901,274 | 2/1990 | Maejima et al. | 395/650 |
| 4,965,724 | 10/1990 | Utsumi et al. | 395/700 |
| 5,029,080 | 7/1991 | Otsuki | 395/375 |
| 5,099,418 | 3/1992 | Pian et al. | 395/650 |
| 5,117,489 | 5/1992 | Komori | 395/375 |
| 5,127,104 | 6/1992 | Dennis | 395/650 |
| 5,175,843 | 12/1992 | Casavant et al. | 395/500 |
| 5,185,873 | 2/1993 | Maejima et al. | 395/375 |
| 5,197,137 | 3/1993 | Kumar et al. | 395/375 |
| 5,241,635 | 8/1993 | Papdopoulos et al. | 395/375 |

FOREIGN PATENT DOCUMENTS 57-146361  9/1982  Japan .
63-106044  11/1988  Japan .

OTHER PUBLICATIONS

German Journal from IBM Deutschland, "Neue Methoden und Techniken der Programierung", part 7, pp. 11–19, 1976.
German Journal, Issue 1, 1989, pp. 316–322.
"Transformation of Numerical Algorithms for Dataflow Processing" Gandiot et al, IEEE 1988, pp. 301–310.
"An Efficient Pipelined Dataflow Processor Architecture", Dennis IEEE 1988, pp. 368–373.
"Code Optimization for Tapped–Token Dataflow Machines" Bohm et al, IEEE, vol. 38, No. 1, Jan. 1989, pp. 4–14.
"Transforming Arbitrary Dataflow Graphs to Synchronous Dataflow Graphs", Lin et al, IEEE 1989, pp. 319–322.
Komon et al., "The Data–Driven Microprocessor", Jun. 1989 I.E.E.E., pp. 45–59.
Baxter et al., "Code Restructuring for . . . ", 1991 I.E.E.E., pp. 252–260.
Mitrovic et al, "A Distributed Memory . . . ", Mar. 1990 I.E.E.E., pp. 148–154.

Primary Examiner—Parshotam S. Lall
Assistant Examiner—Viet Vu
Attorney, Agent, or Firm—Antonelli, Terry, Stout & Kraus

[57] ABSTRACT

A program processing method in a distributed processing system including a shared transmission medium and a plurality of processors connected thereto in which a sequence of processing is executed by the processors in a distributed manner and programs for executing the sequence of processing are respectively stored in the processors. Each processor executed, when information necessary for an execution of a program stored therein is arranged, the program with the arranged information set as input information and then transmits information resultant from the execution to the shared transmission medium. When storing a new program described conforming to a predetermined program, the processor detects program codes respectively of input and output instruction parts of the program to rearranged the parts such that the program codes respectively of the input and output instruction parts are located at positions in the program respectively before and after other processing part. When information necessary for an execution of the program is prepared, the processor executes the input and output instruction parts respectively before and after the other processing.

12 Claims, 40 Drawing Sheets

FIG. 3A

BEGIN ~301
⋮
IN  A1 ~302
⋮
OUT B1 ~303
⋮
END ~304

FIG. 3B

BEGIN ~301

IN  A1 ~311

A1 ← A1 ~312
⋮
A1 ← #A1 ~313
⋮
B1 ← B1 ~314
⋮
OUT #B1 ~315

END ~304

FIG. 4A

```
BEGIN              ~301
  ⋮
RECEIVE  A1        ~401
  ⋮
SEND     B1        ~402
  ⋮
END                ~304
```

FIG. 4B

```
BEGIN              ~301
  RECEIVE  A1      ~411
  #A1 ← A1         ~412
    ⋮
  A1 ← #A1         ~413
    ⋮
  #B1 ← B1         ~414
    ⋮
  SEND  #B1        ~415
END                ~304
```

FIG. 5A

```
BEGIN         ~301
  ⋮
IN  Ai        ~501
  ⋮
IN  Ai        ~502
  ⋮
END           ~304
```

FIG. 5B

```
BEGIN         ~301
  IN  Ai      ~511
  #Ai ← Ai    ~512
  ⋮
  Ai ← #Ai    ~513
  ⋮
  Ai ← #Ai    ~514
  ⋮
END           ~304
```

FIG. 6A

BEGIN ~301
:
:
IN  A₁  ~601
:
IN  A₂  ~602
:
:
END  ~304

FIG. 6B

BEGIN ~301
   IN A₁,A₂  ~611
   #A₁←A₁  ~612
   #A₂←A₂  ~613
   :
   A₁←#A₁  ~614

A₂←#A₂  ~615
   :
   :
   END  ~304

F I G. 7A

BEGIN ~301
•
•
OUT B1   ~701
•
OUT B1   ~702
•
END  ~304

F I G. 7B

BEGIN  ~301
•
•
B1 ← B1   ~711
•
B1 ← B1   ~712
•
OUT #B1   ~713

END ~304

FIG. 8A

BEGIN ~301
.
.
OUT B1    ~801
.
OUT B2    ~802
.
.
END       ~304

FIG. 8B

BEGIN ~301
.
.
B1 ← B1    ~811
.
B2 ← B2    ~812
.
.
OUT #B1, #B2 ~813

END    ~304

FIG. 9A

BEGIN ~301
⋮
IN A₁ ~901
⋮
OUT A₁ ~902
⋅
END ~304

FIG. 9B

BEGIN ~301

IN A₁ ~911

A₁ ← A₁ ~912
⋮
A₁ ← #A₁ ~913
⋮
A₁ ← A₁ ~914
⋅
OUT #A₁ ~915

END ~304

FIG. 10A

BEGIN ~301
⋮
IN A1 ~1001
⋮
OUT A1 ~1002
⋮
IN A1 ~1003
⋮
END ~304

FIG. 10B

BEGIN ~301
IN A1 ~1011
A1 ← A1 ~1012
⋮
A1 ← #A1 ~1013
⋮
A1 ← A1 ~1014
⋮
A1 ← #A1 ~1015
⋮
OUT #A1 ~1016

END ~304

FIG. 11A

```
BEGIN  ~1101
  ⋮
IF(C₁)  ~1102
{ ⋮
    IN  A₁  ~1103
      ⋮
    OUT B₁  ~1104
      ⋮
}
ELSE  ~1105
{ ⋮
    IN  A₂  ~1106
      ⋮
    OUT B₂  ~1107
      ⋮
}
  ⋮
END  ~1108
```

FIG. 11B

```
BEGIN ~1101
    IN  A1, A2        ~1111
    #A1 ← A1 ~1112
    #A2 ← A2 ~1113
    ⋮
    IF (c1) ~1102
    { #c1 ← c1 ~1114
        A1 ← #A1 ~1115
        ⋮
        #B1 ← B1 ~1116
        ⋮
    }
    ELSE ~1105
    { ⋮
        A2 ← #A2 ~1117
        ⋮
        #B2 ← B2 ~1118
        ⋮
    }
    ⋮
    IF(#c1) OUT #B1   ~1119
    ELSE    OUT #B2   ~1120

END ~1108
```

FIG. 12A

```
BEGIN ~1201
   .
   .

FOR ( l=1, 10: l++)        ~1202
   {  .
      IN  A_l     ~1203
         .
         .
      OUT B_l     ~1204
         .
   }
      .
      .
END  ~1205
```

FIG. 12B

```
BEGIN        ~1201
    IN  A₁       ~1211
    #A₁ ← A₁     ~1212
        ⋮
    FOR (i=1, 10: i++)   ~1202
    { •

A₁ ← #A₁     ~1213
        ⋮
    #B₁ ← B₁     ~1214
        •
    }
        ⋮
    OUT #B₁      ~1215
END          ~1205
```

FIG. 13A

BEGIN ~1301

⋮

FOR ( i=1, 10 : i++ )    ~1302
{ •

IN $A_i$    ~1303

⋮

OUT $B_i$    ~1304

•
}

⋮

END ~1305

FIG. 13B

```
BEGIN    ~1301
  FOR(i=1,10:i++)            ~1311
  {
          IN  Aᵢ        ~1312
          #Aᵢ → Aᵢ     ~1313
  }
  :

FOR(i=1,10)          ~1302
  {    •
          Aᵢ → #Aᵢ     ~1314
          :
          #Bᵢ → Bᵢ     ~1315
          •
  }
  :

FOR(i=1,10:i++)OUT  #Bᵢ     ~1316
END    ~1305
```

FIG. 14A

```
BEGIN      ~1401
  ⋮
CALL SUB   ~1402
  ⋮
END        ~1403
  SUB      ~1404
    ⋮
  IN  A₁   ~1405
    ⋮
  OUT B₁   ~1406
    ⋮
  RETURN   ~1407
```

FIG. 14B

```
BEGIN        ~1401
  IN  A₁     ~1411
  #A₁ ← A₁   ~1412
    ⋮
  CALL SUB   ~1402
    ⋮
  OUT #B₁    ~1413
END          ~1403
  SUB        ~1404
    ⋮
  A₁ ← #A₁   ~1414
    ⋮
  #B₁ ← B₁   ~1415
    ⋮
  RETURN     ~1407
```

```
BEGIN        ~1601
  :
  RECEIVE (A₁, CC₁)    ~1602
  :
  SEND (B₁, CC₂)       ~1603
  :
END          ~1604
```

```
BEGIN     ~1601
  RECEIVE (A₁, CC₁)    ~1611
  #A₁ ← A₁             ~1612
   :
  A₁ ← #A₁             ~1613
   :
  #B₁ ← B₁             ~1614
   :
  SEND (#B₁, CC₂)      ~1615
END       ~1604
```

FIG. 18

| CONTENT CODE (2021) | DATA ITEM COUNT (2022) | DATA ITEM NAME (2023) | DATA ITEM NAME | ... (2131) |
|---|---|---|---|---|
| | | | | |
| | | | | |
| | | | | |
| | | | | |

CONTENT CODE FILE

FIG. 19

| DATA ITEM NAME (2031) | DATA UNIT LENGTH (2032) | ARRAY ELEMENT COUNT (2033) | DATA CODE (2034) | SIGN (2035) (2132) |
|---|---|---|---|---|
| | | | | |
| | | | | |
| | | | | |

DATA ITEM FILE

FUNCTION MODULE FILE

| END | | | | | | | DATA – CC MAP | | | | | | SELECT / PAGE / SHIFT | | | |
|---|---|---|---|---|---|---|---|---|---|---|---|---|---|---|---|---|
| CC | Y00 S4 | YB1 002 | YB1 003 | YB1 004 | YB1 D3 | YB1 D4 | YC1 O1 | YC2 B1 | YD3 B1 | YD3 G2 | YD4 O4 | YD4 F5 | YG1 B1 | YG1 C1 | YG1 D3 | YG3 B1 |
| # DATA | | | | | | | | | | | | | | | | |
| 0 bftoadr | | | | | | | | | | | | | | | | |
| 1 coildie | | | | | | | | | | | | | | | | |
| 2 coildii | | | | | | | | | | | | | | | | |
| 3 coilno | | | | | | | * | * | * | | | | | * | * | * |
| 4 coilsu | | * | | | | | * | * | | | | | | * | | |
| 5 coiltbno | | | | | | | | | | | * | | | | | * |
| 6 coiltocd | | | | | | | * | * | | | | | * | * | * | * |
| 7 coilwd | | * | * | * | * | * | * | * | * | * | * | * | * | * | * | * |
| 8 cc | | | | | | | | | | | | | | | | |
| 9 fromadr | | | | | | | | | | | | | | | | |
| 10 hddr | * | | | | | | | | | | | | | | | |
| 11 incoilno | | | | | * | | | | | | | | | | | |
| 12 inform | * | | | | | | | | | | | | | | | |
| 13 iseqreq | | | | | | | | | | | | | | | | |
| 14 key | | | | | | | | | | | | | | | | |
| 15 logicno | | | | | | | | | | | | | | | * | |
| 16 mpcl | | | | | | | | | | | | | | | | |
| 17 saisoid | | | | | | | | | * | | | | | | | |
| 18 space | | | | | | | | | | | | | | | | |
| 19 subcc | | * | * | * | * | * | * | * | * | * | * | * | * | * | * | * |
| 20 tblstat | | | | | | | | | | | * | | | | | |
| 21 toadr | | | | | | | | | | | * | | | | | * |
| 22 wrkid | | | * | | | * | | | | | | | | | | * |

CC-MODULE MAP

SELECT / PAGE / SHIFT

END

| # | MODULE CC | A_A DRS RC | A_I COW RK | A_L DDR CV | A_L DDS ND | A_T OAC CH | A_T OAD CH | A_W RKM AK | B_A DRS RC | B_C GDL NK | B_C COC HG | B_I COW RK | B_I DAB DT | B_I NSE Q | B_I NSE Q2 | B_L DDS ND | B_U PRC V |
|---|---|---|---|---|---|---|---|---|---|---|---|---|---|---|---|---|---|
| 0 | Y00S4 | | O | | | | | | | | O | O | | | | | |
| 1 | YB1OO2 | — | | | — | | | | — | | | | | | — | — | |
| 2 | YB1OO3 | | | | | | | | | | | | | | — | | |
| 3 | YB1OO4 | O | | | | | | O | | | | | | | | | |
| 4 | YB1D3 | | | | | | | | | | | | | | | | |
| 5 | YB1D4 | | — | | | | | | | | — | — | | | | | |
| 6 | YC1O2 | | | | | | | | | | | | | | | | |
| 7 | YC2B1 | | | | | | | | | | | | | | | | |
| 8 | YD3B1 | | | | | | | | O | | | | | O | | | |
| 9 | YD3G2 | | | | | | | | | | | | | O | | | |
| 10 | YD404 | | | | | | | | | | | | | | | | |
| 11 | YD4F5 | | | | | | | | | | | | | | | | |
| 12 | YG1B1 | | | | | | | | | | | | | | | | |
| 13 | YG1C1 | | | | | | | | | | | | | | | | |
| 14 | YG1D3 | | | O | | | | — | | — | | | | — | | | O |
| 15 | YG3B1 | | | — | | | | | | O | | | | | | | |
| 16 | YG4G5 | | | | O | | | | | | | | | | | | |
| 17 | YG4S6 | | | | | | — | | | | | | | | | O | |
| 18 | YG5S3 | | | | | | | | | | | | | | | O | |
| 19 | YS5G3 | | | | | O | | | | | | | — | | | | |

FIG. 23

DATA-MODULE MAP

| # | DATA | A_A DRS RC | A_I COW RK | A_L DDR CV | A_L DDS ND | A_T OAC CH | A_T OAD CH | A_W RKM AK | B_A DRS RC | B_C GDL NK | B_I COC HG | B_I COW RK | B_I DAB DT | B_I NSE Q | B_I NSE Q2 | B_L DDS ND | B_U PRC V |
|---|---|---|---|---|---|---|---|---|---|---|---|---|---|---|---|---|---|
| 0 | bftoadr | | | | | | | | | | | | | | | ○ | |
| 1 | coildie | | | | | | | | | – | | | | | | ○ | |
| 2 | coildii | | | ○ | | | | | | ○ | | | | | | ○ | |
| 3 | coilno | ○ | | ○ | ○ | ○ | – | | ○ | ○ | | | | ○ | | | ○ |
| 4 | coilsu | | | ○ | | | | | | | | | | | | | |
| 5 | coiltbno | | | ○ | – | ○ | – | – | ○ | – | – | – | – | ○ | | ○ | |
| 6 | coiltocd | | | ○ | ○ | | – | ○ | | ○ | | | | | – | ○ | |
| 7 | coiltwd | | | – | ○ | ○ | – | – | | – | | | | | | ○ | ○ |
| 8 | cc | ○ | ○ | | | | | | | | ○ | ○ | | | | | |
| 9 | fromadr | | ○ | | | | | | | | ○ | ○ | | | | | |
| 10 | hddr | | | | ○ | ○ | – | ○ | ○ | | | | | ○ | – | ○ | ○ |
| 11 | incoilno | | | – | ○ | ○ | – | – | | ○ | | | | – | | | |
| 12 | inform | | | | | | – | | | | | | | | | | |
| 13 | iseqreq | | | | | | | | | | | | | | | | |
| 14 | key | | | | | | | | | | | | | | | | |
| 15 | logicno | | | | | | | | | | | | | ○ | | | |
| 16 | mpcl | | | | | | | | | | | | | | | | |
| 17 | saisoid | | | – | ○ | | | ○ | ○ | ○ | | | | ○ | – | ○ | |
| 18 | space | | | – | ○ | – | | | ○ | | | | | | | ○ | |
| 19 | subcc | ○ | | ○ | | | | | | | | | | | | ○ | |
| 20 | tblstat | | | | – | – | – | | | | | | | | | ○ | |
| 21 | toadr | | ○ | ○ | ○ | – | – | – | | – | – | – | – | ○ | | ○ | |
| 22 | wrkid | | ○ | ○ | ○ | – | – | – | ○ | – | – | – | – | ○ | | ○ | |

FIG. 31

| PAGE NO. (2811) | COLUMN NO. (2812) | | RELATE FUNCTION MODULE COUNT (2813) | | | |
|---|---|---|---|---|---|---|
| FUNCTION MODULE NAME | INPUT CONTENT CODE COUNT (2815) | INPUT CONTENT CODE (2816) | --- | OUTPUT CONTENT CODE COUNT (2817) | OUTPUT CONTENT CODE (2818) | --- |
| | | | | | | |
| PAGE NO. | COLUMN NO. | | | | | |
| | | | | | | |

CONTENT CODE/DATA ITEM CROSS TABLE

| DATA ITEM NAME (2821) | CONTENT CODE ITEM (2822) | RELATED CONTENT CODE NAME (2823) | --- (2182) |
|---|---|---|---|
| | | | |
| | | | |

FIG. 33

FUNCTION MODULE / CONTENT CODE CROSS TABLE (2183)

| FUNCTION MODULE NAME (2835) | INPUT CONTENT CODE COUNT (2831) | INPUT CONTENT CODE (2832) | |
|---|---|---|---|
| | OUTPUT CONTENT CODE COUNT (2833) | OUTPUT CONTENT CODE (2834) | |
| | | | |

FIG. 34

FUNCTION MODULE/ DATA ITEM CROSS TABLE 2184

| FUNCTION MODULE NAME (2841) | INPUT DATA ITEM COUNT (2842) | DATA ITEM NAME (2843) | --- |
|---|---|---|---|
| | OUTPUT DATA ITEM COUNT | DATA ITEM NAME | --- |
| | 2844 | 2845 | |
| | | | |

FIG. 35

I/O INSTRUCTION PROGRAM SOURCE FILE 286

| PROGRAM NAME (2861) | PROGRAM LENGTH (2862) |
|---|---|
| | |

PROGRAM PROCESSING METHOD AND APPARATUS FOR PRODUCING A DATA FLOW TYPE PROGRAM

CROSS-REFERENCE TO RELATED PATENT APPLICATIONS

The present application relates to Ser. No. 07/432,896 entitled PROGRAMMING SUPPORT METHOD AND SYSTEM and filed on Nov. 7, 1990 by Y. SUZUKI et al. (now abandoned), the contents of which are incorporated herein as appendix A.

BACKGROUND OF THE INVENTION

The present invention relates to a program processing method and apparatus. The present invention is particularly effective in a case where a program developed without taking a data flow into consideration is employed to automatically produce a program of a data flow type by using a program code of the original program or in a case where there is created an input/output (I/O) program of a data flow structure of which I/O specifications are defined by message data.

Heretofore, the conventional software achieving a totally centralized control operation is executed in an environment which is insufficient with respect to the software expendability and maintenance. This has been an onerous hindrance when constructing a system.

In order to remove the problem, there has been known a distributed processing method adopting a plurality of information processing apparatuses connected to a shared or common transmission medium to accomplish a sequence of data processing steps in a distributed manner.

As mentioned above, in a case where a sequence of data processing steps of a job is achieved by a plurality of processors in a distributed fashion, there may be adopted a method in which one of the processors conducts a program execution control for the other processors. However, this method is attended with a disadvantage that a control program utilized to control the processors becomes quite complex, for example, due to complications in the scheduling operation of programs to be executed on the other processors. Moreover, there exists another difficulty that a failure in the control processor leads the overall system to a system down mode. In addition, due to the concentration of information on the control processors, the processing speed is lowered in the system.

As a method of solving the difficulties mentioned above, there has been known in the conventional technology a method, for example, described in the JP-A-56-146361 (1982). In this method, in an environment of a distributed system established in consideration of autonomy of the software, the program drive and execution are controlled in a manner associated with a data flow.

Namely, this method is a distributed processing method applicable to a plurality of processors in which sequences of data processing steps can be executed by the respective processors without using the supervision of the control processor. Namely, the processors interconnected with each other via a shared transmission medium are each loaded with a program which executes a sequence of the processing steps of a job in a distributed manner. In each processor, when data is received from the transmission path and a set of data necessary for an execution of a program are completely arranged therein, the program is to be initiated.

In the prior art, the method of controlling the program execution has been described, however, considerations have not been given to how to generate a program achieving an operation of a data flow type. Namely, the technical problem for the program development has not been solved.

That is, as described in the JP-A-57-146361 (1982), in order to implement a method of controlling the operations to drive and to execute a program in a manner related to a data flow in a distributed system environment prepared in consideration of the software autonomy, the program is inevitably created to accomplish an operation of a data flow type. Consequently, a programmer producing the program is required to give consideration to a method of generating a program running in relation to a data flow, not to a method of the accustomed program language. This has been a heavy burden on the programmer.

Moreover, one of the conventional program developing methods has been, for example, a flow oriented program developing method described in the JP-A-63106044 (1988). In this method, a program developer need recognize logic only in a flow chart to develop a program without paying attention to source, object, and load module files.

In this regard, when a program is to be developed in the conventional technology, I/O processing is not discriminated from application processing in program specifications. Namely, in a processing flow, such processing is produced, for example, by describing appropriate steps at a point where external data is required. Consequently, the program processing includes all processing procedures ranging from acquisition of the external data to an operation to load an external device with data resultant from processing. For attaining a complete program, the described program processing then undergoes program development including program debugging, compilation, linkage, and loading.

Namely, in the prior art, a shared table is adopted to communicate data between a plurality of program routines such that a data source side writes data in the shared table and then supplies a data destination side with a fact that the data has been written in the shared table together with a location (address) where the data has been written. On receiving the notification, the data destination side can obtain the data from the shared table. On the data receiving side, it is necessary to prepare, in addition to the inherent application program, a program to be used for the processing, for example, to read the data from the shared table and to identify the routine on the data source side.

As described above, according to the conventional technology, in order to minimize the processing procedures of a program, the program is structured as follows. In the program, all input data are not acquired at the same time, namely, portions of the input data are sequentially received to be checked. When the data portion is found to be wrong, the data acquisition is stopped at the point to terminate the processing. Consequently, the program repeatedly achieves a procedure in which a portion of input data is received to conduct with the data a portion of application processing to be accomplished by the program so as to write as output data a result of the partial application processing in an external device. For the program development processes such as the compilation, linkage, and loading of the program, it is assumed as a premise that input processing and output processing are to be integral with application processing.

In the program development processes, the external specifications (i.e. the design and internal specifications of input and output data) cannot be separated from the internal specifications (i.e. the design specification of the application processing). Consequently, even when inconsistency appears in the specifications, it is difficult to determine a location in which one of the internal and external specifications causes the inconsistency causes an implementation error. As a result, the program debug efficiency is deteriorated.

SUMMARY OF THE INVENTION

It is therefore a first object of the present invention to provide a program generating method and apparatus of a data flow type in which a user creating a program generates a program according to a predetermined format without paying attention to a data flow. At a registration of the program to an execution environment thereof, a processor memorizing the program conducts operations to convert the program to a program of a data flow type and to set execution conditions, thereby mitigating loads imposed on the user.

A second object of the invention is to provide an I/O specification program generating method and apparatus in which program modules are separately generated in a concurrent manner to automatically accomplish a check for consistency therebetween, thereby improving the productivity of the program through the overall processes. Moreover, by automatically creating only I/O instructions of the program, the programming efficiency is increased.

In order to achieve the first object, the method according to the present invention is characterized in that when a new program described in a predetermined program code is to be memorized in a processor, a program code of an input processing portion and a program code of an output processing portion are detected from the program. In the program, the detected program code of the input processing portion is arranged before the other processing portions, whereas the detected program code of the output processing portion is arranged after the other processing portions. When a set of information items necessary for an execution of the program are obtained, the overall information is used as input information to execute the program processing in which the input processing portion is effected prior to the other processing portions and the output processing portion is conducted after to the other processing portions.

In accordance with the present invention, when memorizing a program, the processor retrieves and recognizes, based on program codes, an input information processing description portion and an output information processing description portion which are written in the program in conformity with a predetermined format and which are necessary to drive the program.

The program is reconstructed such that the input processing portion is executed at a time before the other processing portions of the program and the output processing portion is achieved at a time after the other processing portions.

Furthermore, based on relationships between the I/O informations, the software controlling the execution of the program automatically establishes conditions for the program execution.

As a result, an execution environment of a newly developed program is automatically formed when the program is registered to an execution thereof.

Consequently, when information items necessary for execution of the program are selected from information received via the shared transmission medium, the program is driven. The information items are passed to the program when the program is thus activated.

Moreover, at an end of the program processing, information produced from the program is sent to the shared transmission medium.

As set forth above, a program described and generated without paying attention to the data flow is reconstructed into a program of a data flow type to be executed thereafter.

In order to achieve the second object, the method according to the present invention is characterized by a program that includes software modules designed to comprise an input processing portion, an output processing portion, and an application processing portion. Processing instructions of the input and output processing portions are first adopted to generate a program to be compiled, thereby creating an object module. Thereafter, the object modules are linked with each other to produce an execution module, which is registered to and is stored in an actual or execution environment.

According to the present invention, in a program design process, a program is subdivided into three portions or parts i.e. an input processing part, an output processing part, and an application processing part so as to thereafter generate a program only comprising the input and output processing parts. A plurality of software modules constituting a program are linked with each other by exchanging message data. More specifically, message data is directly broadcast to be exchanged between software modules without using a shared table. As a result, there is produced a program including only I/O instructions. First, I/O instructions are defined by describing names assigned to data items at a program variable level. This leads to automatic editing of a program in a format to be received by a compiler. Processing instructions for the input/output operations need not be described for definitions. Namely, the linkage processing selects appropriate instructions adaptive to input/output operations to incorporate the selected instructions into the program, thereby enabling the automatic linkage to be accomplished. As set forth above, since the program execution is possible in a state where the application program is missing, the program is then directly edited into a form to be compiled. Moreover, the executable I/O instructions are incorporated thereinto so that the resultant program modules are linked to obtain object modules, which are then registered to and stored in an actual environment.

Consequently, the relationships related to message exchanges are retained between the modules and hence the program can be executed. That is, the modules can be operated with a software configuration and relationships between the modules which are identical to those of the final state established when the application processing part is generated.

The foregoing and other objects, advantages, manner of operation and novel features of the present invention will be understood from the following detailed description when read in connection with the accompanying drawings.

BRIEF DESCRIPTION OF THE DRAWINGS

FIGS. 3A and 3B are schematic diagrams for explaining a specific example in which a program of a data flow type is generated according to the processing of FIG. 2;

FIGS. 4A and 4B are explanatory diagrams useful to explain a concrete processing example based on the processing of FIG. 2;

FIGS. 5A and 5B are explanatory diagrams useful to explain a concrete processing example based on the processing of FIG. 2 in a case where input processing is to be employed at a plurality of locations for identical information in a program of a concatenation type;

FIGS. 6A and 6B are explanatory diagrams useful to explain a concrete processing example related to the processing of FIG. 2 in a case where input processing is to be accomplished for different information items in a program of a concatenation type;

FIGS. 7A and 7B are explanatory diagrams useful to explain a concrete processing example based on the processing of FIG. 2 in a case where output processing is to be employed at a plurality of locations for identical information in a program of a concatenation type;

FIGS. 8A and 8B are explanatory diagrams useful to explain a concrete processing example related to the processing of FIG. 2 in a case where output processing is to be accomplished for different information items in a program of a concatenation type;

FIGS. 9A and 9B are explanatory diagrams useful to explain a concrete processing example related to the processing of FIG. 2 in a case where input processing and output processing are to be accomplished in this order for identical information in a program of a concatenation type;

FIGS. 10A and 10B are explanatory diagrams useful to explain a concrete processing example related to the processing of FIG. 2 in a case where input processing and output processing are to be accomplished respectively at a plurality of locations for identical information in a program of a concatenation type;

FIGS. 11A and 11B are explanatory diagrams for explaining a specific processing example of a method of generating a program of a branch type based on the processing of FIG. 2;

FIGS. 12A and 12B are explanatory diagrams for explaining a specific processing example of a method of generating a program of a repetition type based on the processing of FIG. 2;

FIG. 13A and 13B are explanatory diagrams for explaining a specific processing example based on the processing of FIG. 2 in a case where input/output information varies for each repetitious execution in a repetition or iteration statement;

FIGS. 14A and 14B are explanatory diagrams for explaining a specific processing example based on the processing of FIG. 2 in a case where subroutines are called in a program;

FIG. 18 is a diagram showing in detail a content code file of FIG. 17;

FIG. 19 is a diagram showing in detail a data item file of FIG. 17;

FIG. 21 is a diagram showing contents of a cross-reference between content codes and data items of FIG. 27;

FIG. 22 is a diagram showing contents of a cross-reference between function modules and content codes of FIG. 27;

FIG. 23 is a diagram showing contents of a cross-reference between function modules and data items of FIG. 27;

FIG. 31 is a diagram showing contents of a system flow table of FIG. 17;

FIG. 32 is a diagram showing contents of a content code/data item cross-reference or cross table of FIG. 17;

FIG. 33 is a diagram showing contents of a function module/content code cross table of FIG. 17;

FIG. 34 is a diagram showing contents of a function module/data item cross table of FIG. 17;

FIG. 35 is a diagram showing contents of an I/O instruction program source file of FIG. 17;

DESCRIPTION OF THE PREFERRED EMBODIMENT

Referring now the drawings, a description will be given of embodiments according to the present invention.

Figure 1:
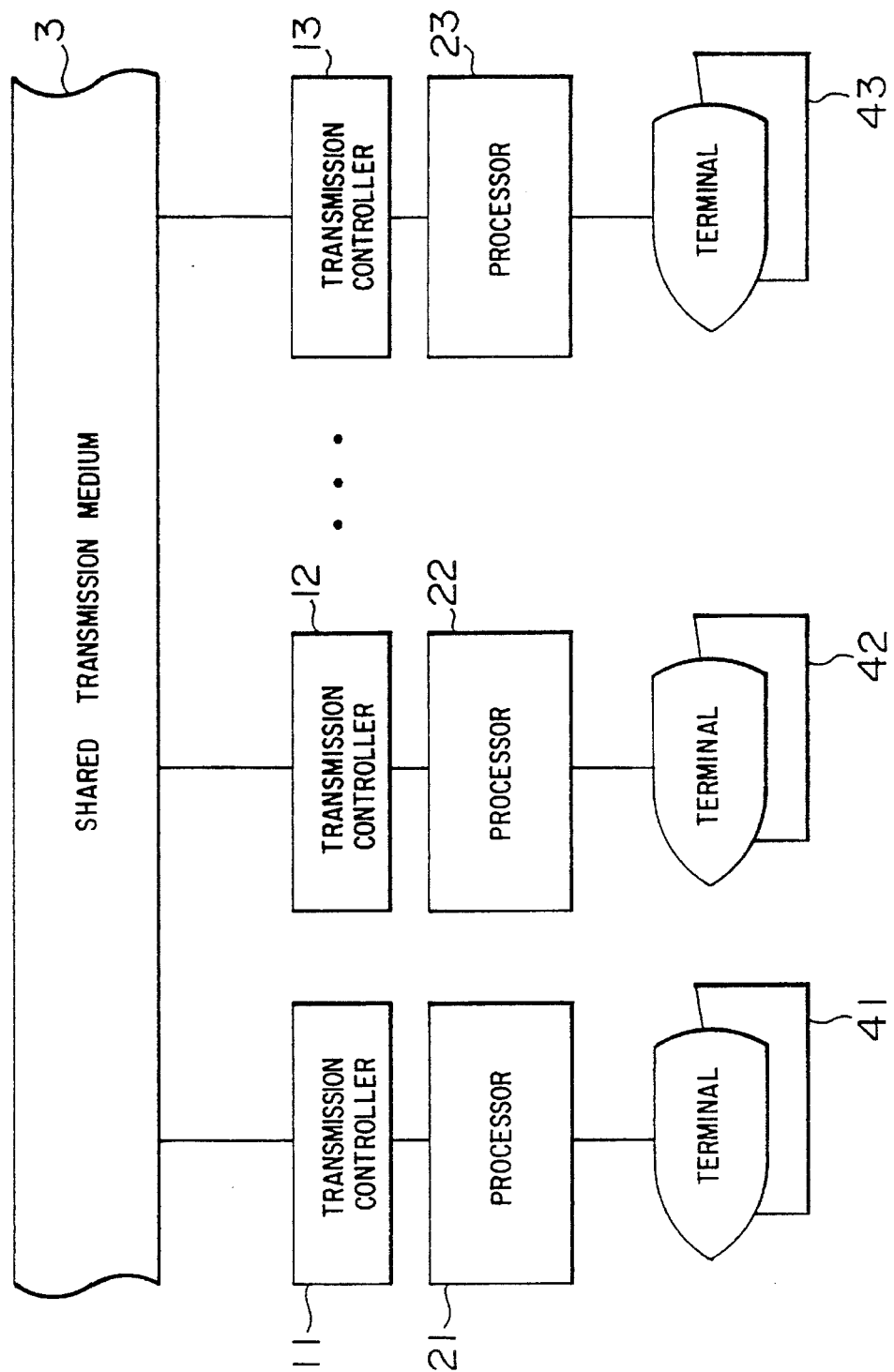
FIG. 1 is a block diagram schematically showing the constitution of the distributed processing system in which a first embodiment of the program processing method is implemented according to the present invention.

FIG. 1 is a block diagram showing the configuration of a distributed processing system in which a first embodiment of the program processing method is realized according to the present invention.

The configuration includes processors 21 to 23, each for executing the program processing method of the present invention, terminal apparatuses 41 to 43, each having a display and a keyboard, and transmission controllers 11 to 13, each controlling information communications via a shared transmission medium 3.

The processors 21 to 23 are connected to the shared transmission medium 3 via the transmission controllers 11 to 13, respectively so as to conduct communications therebetween.

The processors 21 to 23 are linked with the terminals 41 to 43, respectively.

A terminal here has a man-machine interface implemented by apparatuses such a display and a keyboard to develop a function to generate a predetermined program. The program can be executed on a processor by use of the interface.

The processors 21 to 23 respectively accomplish an automatic program conversion for programs which are manually described in appropriate programming languages via the related terminals 41 to 43 and which are generated in various forms. As a result of the conversion, there is created a new program of a data flow type, which is driven and is executed in a manner associated with a data flow.

Next, a description will be given of the processing method.

Figure 2:
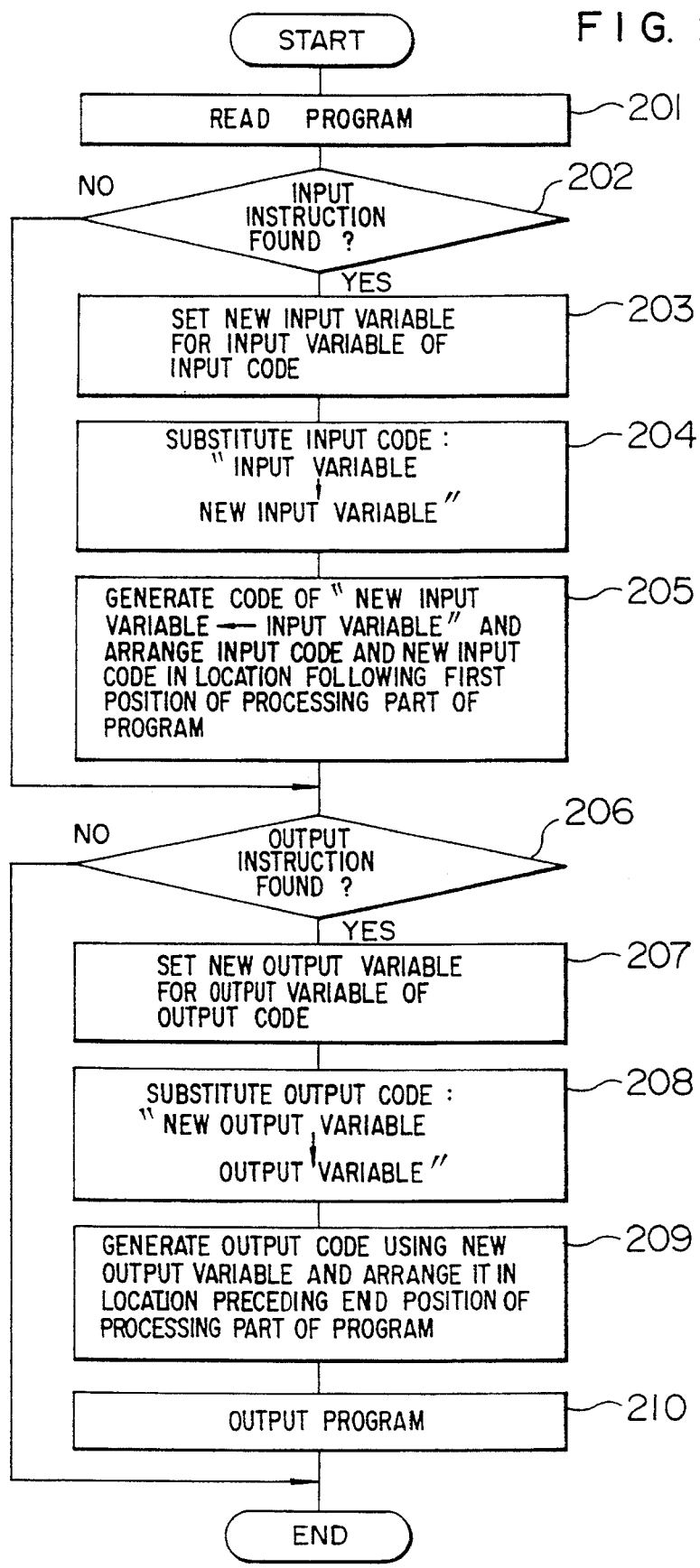
FIG. 2 is a flowchart showing an example of the operation achieved by a processor in the system of FIG. 1.

FIG. 2 is a flowchart showing the processing operation of the processors 21 to 23 of FIG. 1 according to the present invention.

First, a program to be processed is read in the system (step 201) and then a check is made to decide whether or not the program includes an input processing part i.e. an input code (step 202). If this is the case, a new input variable is set for an input variable already included in the input code (step 203).

Subsequently, an item of the input code is replaced with a program code of an assignment statement "input variable ← new input variable" (step 204).

Moreover, the input code and a program code of an assignment statement "new input variable ←input variable" are inserted in a first position of the processing part of the program (step (205).

As a result of the processing above, there has been created a complete program code which executes the input processing part of the program at the beginning of the program processing.

On the other hand, when the program includes an output processing part i.e. an output code (step 206), a new output variable is set in relation to an existing output variable of the output code (step 207) and then an item of the output code is substituted for a program code of an assignment statement "new output variable ←output variable" (step 208).

In addition, an output code using the new output variable is produced to be inserted in a location preceding an end position of the processing part of this program (step 209).

As a result, there has been completely created a program code which effects the output processing part of the program at an end of the program processing.

Through the processing thus accomplished for the input and output processing parts, the program is transformed into a program of a data flow type, which is finally output (step 210).

The processors 21 to 23 of FIG. 1 conduct the processing operations above to convert programs respectively input from the terminals 41 to 43 into programs of a data flow type.

Next, referring to a specific program example, a description will be given of the operation achieved by the processors 21 to 23 of FIG. 1 according to the present invention.

FIGS. 3A and 3B are explanatory diagrams for explaining a concrete example of an operation executed in each of the processors 21 to 23 of FIG. 1 to generate a program of a data flow type.

FIG. 3A shows a program created by the terminal 41, 42, or 43 of FIG. 1.

FIG. 3B shows a program of a data flow type produced by translating the program above by the processor of FIG. 1.

In FIG. 3A, "begin" 301 and "end" 304 are source codes respectively representing a beginning point and an ending point of the program. Moreover, "in" denotes a program code of processing to receive information form an external source outside the program, whereas "out" designates a program code of processing to send information to an external destination.

That is, "in $A_1$" 302 represents that information "$A_1$" is acquired from an external source, whereas "out $B_1$" indicates that information "$B_1$" is passed to an external destination Moreover, in FIG. 3B, "$\#A_1 \leftarrow A_1$" 312 means that information of "$A_1$" is stored in "$A_1$", "$A_1 \leftarrow \#A_1$" 313 represents that information of "$\#A_1$" is moved to "$A_1$" and "$\#B_1 \leftarrow B_1$" 314 designates that information of "$B_1$" is loaded in "$\#B_1$".

In other words, the program shown in FIG. 3A has been transformed into the program of FIG. 3B in which a source program ranging from "in $A_1$" 302 to "out $B_1$" 303 of FIG. 3A is replaced with a source program ranging from "in $A_1$" 311 to "out $\#B_1$" 315. The resultant program is thereafter incorporated into the system.

The program of FIG. 3B is configured such that input processing to acquire inputs from an external source and output processing to deliver outputs to an external destination are respectively accomplished at the beginning and end of the program, thereby forming the program in a data flow type.

In this regard, "$\#A_1$" and "$\#B_1$" are names adopted for the input/output processing steps which are established when the program of FIG. 3A is converted into that shown in FIG. 3B. These names are assumed to be other than the names utilized in the original program of FIG. 3A.

When assigning the names, there are beforehand provided such rules, for example, in a program generation as that a name including # as the first character thereof is not to be used. Alternatively, there may be adopted, for example, a method in which, for each assignment of the name, the program source modules are entirely retrieved to determine a name other than those already used therein.

In addition, the source code is assumed to be described in conformity with a predetermined format and syntactical rules of an appropriate programming language.

That is, the source codes of FIGS. 3A and 3B are described only by way of example. The I/O processing codes are not limited to "in" and "out". For example, a programming language employing I/O processing codes of "receive" and "send" or "read" and "write" may be utilized without causing any problem.

Referring next to other programs, a description will be given of a concrete example of the program processing method according to the present invention.

In general, a program includes processing of various forms. In the description of the embodiments, below, the basic forms of program statements will be classified into three types as follows.

(i) Concatenation type: The program is executed in a sequence of program steps.
(ii) Branch type: The program execution order changes depending on a condition.
(iii) Repetition type: Identical processing is repeatedly achieved a predetermined number of times.

Moreover, by way of an example related to a program description, a description will be given of an embodiment in a case where (iv) A program includes subroutines.

First, an embodiment of the (i) concatenation type will be described.

Although the program codes of FIGS. 3A and 3B are also program examples of the concatenation type, another typical example will be shown in FIGS. 4A and 4B.

FIGS. 4A and 4B are explanatory diagrams showing a specific processing example of a program of a concatenation type according to the present invention.

The program codes of FIGS. 4A and 4B are implemented by expressing the program codes of FIGS. 3A and 3B in a programming language other than that used in FIGS. 3A and 3B.

Namely, in place of "in" and "out" of the program codes of FIGS. 3A and 3B, "receive" and "send" are respectively adopted in FIGS. 4A and 4B. The program conversion method is entirely the same as the method explained in connection with FIG. 2.

In more detail, the program of FIG. 3A containing program codes ranging from "receive $A_1$" 401 to "send $B_1$" 402 are transformed into the program of FIG. 3B including program codes ranging from "receive $A_1$" 411 to "send #$B_1$" 415, thereby attaining a program of a data flow type. Information assignments are respectively accomplished in the steps "#$A_1 \leftarrow A_1$" 412, "$A_1 \leftarrow$#$A_1$" 413, and "#$B_1 \leftarrow B_1$" 414.

Moreover, the program generation method associated with the concatenation type will be described in conjunction with the following cases (1) to (6).

(1) Input processing for identical information appears in a plurality of positions in the program (FIGS. 5A and 5B).
(2) Input processing is executed for different information items (FIGS. 6A and 6B).
(3) Output processing for identical information appears in a plurality of positions (FIGS. 7A and 7B).
(4) Output processing is executed for different information items (FIGS. 8A and 8B).
(5) Input and output processing are executed in this order to identical information (FIGS. 9A and 9B).
(6) In the case (5), the input processing is again achieved after the output processing (FIGS. 10A and 10B).

A description will be first given of the case (1) where input processing is conducted for identical information at a plurality of positions.

FIGS. 5A and 5B show a specific processing example of a program of a concatenation type according to the present invention in a case where input processing is conducted for identical information at a plurality of positions.

In this example, as shown in FIG. 5A, the program created by the terminal 41, 42, or 43 of FIG. 1 has two input processing locations "in $A_1$" 501 and 502 where identical information "$A_1$" is input from an external source.

Like the processing described in relation to the example of FIGS. 3A and 3B, the input processing description part is moved to the first position of the program as shown in FIG. 5B.

In this example, the same input processing parts "in $A_1$" and 501 and 502 are replaced with an input processing part "in $A_1$" 511. Moreover, in the locations where steps "in $A_1$" 511. Moreover, in the locations where steps "in $A_1$" 501 and 502 are originally specified, "$A_1 \leftarrow$#$A_1$" 513 and 514 are respectively employed such that input information "#$A_1$" is substituted for the original data named "$A_1$".

As a result, the obtained program of FIG. 5B carries out the processing of the program of FIG. 5A in a manner associated with a data flow.

In this connection, processing "#$A_1 \leftarrow A_1$" is assigned in consideration of a case where processing (e.g. an assignment of a constant) may take place for information "$A_1$" between "in $A_1$" 511 and "$A_1 \leftarrow$#$A_1$" 513. Namely, the input information "$A_1$" is once save into "#$A_1$" and then the information is again moved to "$A_1$" at the original input processing positions "in $A_1$" 501 and 502, thereby preventing the information "$A_1$" from being destroyed.

Next, a description will be given of the case (2) where input processing is achieved for different information items.

FIGS. 6A and 6B show concrete processing example of a program of a concatenation type according to the present invention in a case where input processing is achieved for different information items.

The program of FIGS. 6A and 6B include information input processing in steps "in $A_1$" 601 and "in $A_2$" 602. These input processing description parts are transformed through the processing of FIG. 2 into "in $A_1, A_2$" 611 to be arranged in the first location of the program as shown in FIG. 6B.

The description "in $A_1, A_2$" 611 designates that information "$A_2$" and information "$A_2$" are acquired from an external resource. The program codes "in $A_1$" 601 and "in $A_2$" 602 written in the program of FIG. 6A are respectively substituted for "$A_1 \leftarrow$#$A_1$" 614 and "$A_2 \leftarrow$#$A_2$" 615

Subsequently, a description will be given of the case (3) where output processing is achieved at a plurality of positions for identical information.

FIGS. 7A and 7B show concrete processing examples of a program of a concatenation type according to the present invention in a case where output processing is conducted for identical information at a plurality of positions.

In the program of FIG. 7A, output processing of information "$B_1$" is accomplished at two positions "out $B_1$" 701 and 702. These output processing description parts are transformed through the processing of FIG. 2 into "out $B_1$" 713 to be arranged in the last location of the program as shown in FIG. 7B.

The description parts "out $B_1$" 701 and 702 of FIG. 7A are transformed into "#$B_1 \leftarrow B_1$" 711 and 712 in the program of FIG. 7B. In this situation, if there exists a processing step to change a content of "$B_1$" between the steps "out $B_1$" 701 and 702, the content of "$B_1$" varies between the output processing steps of "out $B_1$" 701 and 702.

In the program thus attained in FIG. 7B, the latest content of "$B_1$" namely the content at an 5 execution of the step "#$B_1 \leftarrow B_1$" 712 is output.

In this case, consequently, there may be employed a method to produce the same result in which the processing step of "B#$_1 \leftarrow B_1$" 711 is deleted.

This method is sufficient when the output operation is processed in a concrete manner, for example, when the output is written on a disk.

Moreover, in order to achieve the plural output processing steps "out $B_1$" 701 and 702 at a time or in a single step, it is only necessary to use different names for "#$B_1$" in the steps "#$B_1 \leftarrow B_1$," 711 and 712. For example, "#$B_1$ (1)" and "$B_1$ (2)" are assigned respectively to the steps "#$B_1 \leftarrow B_1$" 711 and 712 such that the outputs are conducted in a single step of "out #$B_1$" 713.

In this case, the step "out #$B_1$" 713 is to be transformed into "out #$B_1$ (1), #$B_1$ (2)".

Next, a description will be given of a case (4) where output processing is accomplished for different information items.

FIGS. 8A and 8B show a concrete processing example of a program of a concatenation type according to the present invention in a case where output processing is achieved for different information items.

The program of FIG. 8A includes information output processing for different information items in steps "out $B_1$" 801 and "out $B_2$" 802.

In this case, respective contents of information items "$B_1$" and "$B_2$" to be output by the steps "out $B_1$" 801 and "out $B_2$" 802 are respectively moved to "#$B_1$" and "#$B_2$" according to the processing of FIG. 2 such that the outputs are achieved at a time in the final program portion "out $B_1$, #$B_2$" 813 as shown in FIG. 8B.

Subsequently, a description will be given of the case (5) where input processing and output processing are achieved in this order for identical information.

FIGS. 9A and 9B show a concrete processing example of a program of a concatenation type according to the present invention in a case where input processing and output processing are accomplished in this order for identical information.

The program of FIG. 9A includes input processing and output processing to be achieved for identical information "$A_1$". Moreover, in this program, after an input processing step "in $A_1$" 901 is completely accomplished an output "out $A_1$" 902 is carried out.

Also in this case, as can be understood from the description of the above embodiments, the input and output processing parts are respectively converted into "in $A_1$" 911 and "out #$A_1$" 915 as shown in FIG. 9B according to the processing of FIG. 2. Moreover, the steps "in $A_1$" 901 and "out $A_1$" 902 are transformed into "$A_1 \leftarrow$ #$A_1$" 913 and "#$A_1 \leftarrow A_1$" 914, respectively.

Subsequently, a description will be given of the case (6) where after an execution of the case (5), namely, after input processing and output processing are achieved in this order for identical information, the input processing is again executed.

FIGS. 10A and 10B show concrete processing examples of a program of a concatenation type according to the present invention in a case where a plurality of input and output processing codes are specified for identical information.

Also in this case, the logic of the program generation above is effectively employed to transform the program of FIG. 10A into the program of FIG.10B.

Comparing this case with the case of FIGS. 9A and 9B, the completely identical method is applied such that the input and output parts are respectively moved to the beginning and end of the program as "in $A_1$" 1011 and "out #$A_1$" 1016, respectively. Namely, the original input and output parts including "in $A_1$" 1001, "out $A_1$" 1002, and "in $A_1$" 1003 are converted into "$A_1 \leftarrow$ #$A_1$" 1013, "#$A_1 \leftarrow A_1$" 1014 "$A_1 \leftarrow$ #$A_1$'1015, respectively.

Concrete examples of the program generating method according to the present invention have been described for the case (i) where the program is of a concatenation type.

A description will now be given of the method for the case (ii) where the program is of a branch type.

FIGS. 11A and 11B show a specific processing example of the program generating method applied to a program of a branch type according to the present invention.

In FIG. 11A, there is shown an example of a program including a branch (if statement).

In the program example of FIG. 11 comprising a condition "$C_1$", if the condition is satisfied, a portion enclosed with brackets "{}" following "if ($C_1$)" 1102 is to be executed; otherwise, a portion enclosed with brackets succeeding "else" 1105 is to be carried out.

Program codes related to I/O instructions are converted into new program codes in the same fashion as for the method described in conjunction with the case (i) where the program is of a concatenation type.

That is, input instructions "in $A_1$" 1103 and "in $A_2$" 1106 of FIG. 11A are converted into "in $A_1$, $A_2$" 1111 to be arranged in the first portion of the program of FIG. 11B.

Moreover, contents of locations of the input instructions "in $A_1$" 1103 and "in $A_2$" 1106 of FIG. 11A are substituted for "$A_1 \leftarrow$ #$A_1$" 1115 and "$A_2 \leftarrow$ #$A_2$" 1117 in the program of FIG. 11B

Since output processing varies depending on conditions, a variable named "#$C_1$" is employed to produce a processing program code to assign a content to the condition "$C_1$" like "#$C_1 \leftarrow C_1$" 1114 of FIG. 11B, immediately after the left-side bracket "{" following "if ($C_1$)" 1102.

Program codes "out $B_1$" 1104 and "out $B_2$" 1107 of FIG. 11A are converted in the same manner as above into "#$B_1 \leftarrow B_1$" 1116 and "#$B_2 \leftarrow B_2$" 1118, respectively.

However, the output instruction part is transformed by use of "#$C_1$" into "if (#$C_1$) out #$B_1$" 1119 and "else out #$B_2$" 1120 to be located in the final portion of FIG. 11B.

A concrete example of the program generation method has been described for the case (ii) where the program is of a branch type.

Subsequently, a description will be given of a specific processing example of the program generation method applied to a program of a repetition type according to the present invention.

FIG. 12A shows a program in which a portion enclosed with brackets following "for (i=1, 10; i++)" is repeatedly executed ten times.

This example is similar to the case where input and output processing instructions are specified at a plurality of positions in a program, which has been described in relation to the case (i). Program codes of FIG. 12A are accordingly converted into program codes of FIG. 12B.

That is, "in $A_1$" 1203 of FIG. 12A is adopted as an input instruction "in $A_1$" 1211 in the first portion of FIG. 12B. Moreover, "#$A_1$" is used in "#$A_1 \leftarrow A_1$" 1212 and the location of "in $A_1$" 1203 is substituted for "$A_1 \leftarrow$ #$A_1$" 1213. In addition, "output $B_1$" 1204 of FIG. 12A is replaced with "#$B_1 \leftarrow B_1$" 1214 in FIG. 12B and an output instruction is expressed as "out #$B_1$" 1215.

Furthermore, as described in conjunction with the case (3) of the concatenation type (i), there may also be utilized a method in which all of the plural output instructions are respectively executed.

Next, a description will be given of the program generation method applied to a case where input/output information varies for each repetitious execution of a repetition statement.

FIGS. 13A and 13B show a concrete processing example of the program generation method in a case where input/output information varies for each repetitious execution of a repetition statement.

The program codes "in A₁" 1203 and "out B₁" 1204 of FIG. 12A are respectively substituted for "in Ai" 1303 and "out Bi" 1304 in FIG. 13A. Namely, each of input/output information items "Ai" and "Bi" varies for each repetitious execution. As a result, the program of FIG. 13A is converted according to the processing of FIG. 2 into a program, which comprises an input processing part including "for (i=1, 10; i++)" 1311, "in Ai" 1312, and "#A₁←A₁" 1313 and an output processing part including "for (i=1, 10; i++) out #B₁" 1316.

Description has been given of concrete processing examples of the program generation method according to the present invention in association with three types of the basic forms of a program, namely, for (i) a program of a concatenation type, (ii) a program of a branch type, and (iii) a program of a repetition type.

Next, a description will be given of the program generation method in a case (iv) where a program includes subroutine calls.

Subroutines are frequently used when generating a program.

FIGS. 14A and 14B show a specific processing example of the program generation method according to the present invention in a case where a program includes subroutine calls.

FIG. 14A shows a program in which "call sub" 1402 is adopted to call a subroutine "sub".

The subroutine "sub" comprises program codes ranging from "sub" 1404 to "return" 1407.

The program of FIG. 14A is equivalent to a program attained by replacing "call sub" 1402 with the program codes from "sub" 1404 to "return" 1407. The resultant program does not include a subroutine call. The program generation method according to the present invention need only be applied to the obtained program.

That is, "in A₁" 1405 of FIG. 14A is arranged as "in A₁" 1411 in the first portion of the program in FIG. 14B. Thereafter, "#A₁←A₁" 1412 is specified for a variable substitution. In the last portion, an output instruction "out #B₁" 1413 is arranged.

In the subroutine, "in A₁" 1405 and "out B₁" 1406 of FIG. 14A are respectively transformed into "A₁←#A₁" 1414 and "#B₁←B₁" 1415 in FIG. 14B.

A description will now be given of a case where a program produced according to the present invention is executed in the processor 21, 22, or 23 of FIG. 1 and input/output instructions of the program are related to communications of information transmitted through the shared transmission medium, 3.

Figures 15, 16A, 16B:
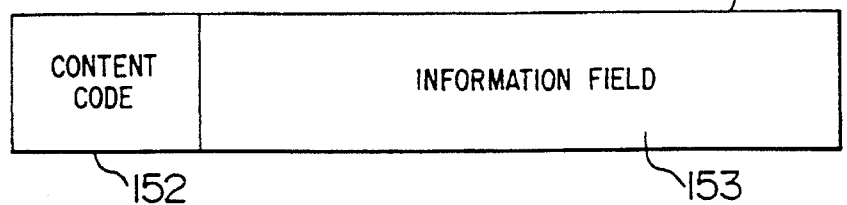
FIG. 15 is a diagram useful to explain the transmission format of information transmitted through a shared transmission medium of FIG. 1.
FIGS. 16A and 16B are explanatory diagrams for explaining a specific processing example of a program executed in the distributed processing system described in conjunction with FIG. 15.

FIG. 15 shows the transmission format of information passed via the shared transmission medium 3 of FIG. 1.

Information 151 communicated through the shared transmission medium 3 of FIG. 1 includes an information field 153 loaded with information and a content code 152 denoting a content of the information.

In the distributed processing system, the information 151 is communicated depending on the content code 152 indicating a content of the information. Namely, the information 151 sent via the shared transmission medium 3 of FIG. 1 is received by the transmission controller 11, 12, or 13 respectively connected to the processor 21, 22, or 23. The content code 152 is checked and then if the information 151 is judged to be necessary for the processor, the controller sends the information 151 thereto.

The processor 21, 22, or 23 receives the information 151 as input data for a program selected from the programs stored in the processor. When necessary information items are arranged as a result of data receiving operations, the program is executed to process the input data items thus obtained.

Information resultant from the processing is assigned with a content code 152 corresponding to the information. The pertinent processor 21, 22, or 23 then transmits the obtained information respectively via the transmission controller 11, 12, or 13 to the shared transmission medium 3.

Among the information passing through the shared transmission medium 3, all information necessary for the processing is then treated such that the content code 152 thereof is registered to and is stored in a storage of the associated transmission controller. Moreover, in a similar fashion, the necessary information related to each program is registered to and is loaded in an internal storage of each processor 21, 22, or 23.

The correspondence relationship between the information 151 and the content code 152 is uniquely determined during the system design phase. The determination method has been described in the JP-A-57-146361 (1982) and hence is a known technology. Consequently, a redundant description thereof will be here avoided.

FIGS. 16A and 16B show specific processing examples of a program executed in the distributed processing system described in connection with FIG. 15.

In FIGS. 16A and 16B, an input instruction "receive (A₁, CC₁)" 1602 contains "CC₁" denoting the content code 152 of FIG. 15. The instruction "receive (A₁, CC₁)" 1602 represents that information of the content code "CC₁" is to be received so as to be stored in "A₁".

Similarly, an output instruction "send (B₁, CC₂)" 1603 expresses that information "B₁" of the content code "CC₁" is to be transmitted.

In this example, for the message transmission and reception, "receive" and "send" are utilized in place of "in" and "out", respectively, The program of FIG. 16B is created from the program of FIG. 16A in the same manner as for the program generation described in connection with FIG. 3.

That is, "receive (A₁, CC₁)" 1602 of FIG. 16A is arranged as an input instruction "receive (A₁, CC₁)" 1611 in the first portion of FIG. 16B "#A₁←A₁" 1612 is specified to load the information "A₁" in "#A₁". Moreover, "A₁←#A₁" 1613 is used to assign the information "#A₁" to "A₁".

In a similar manner, "send (B₁, CC₂)" 1603 of FIG. 16A is replaced with "#B₁←B₁" 1614 in FIG. 16B to store the information "B₁" in "#B₁". Moreover, "send (#B₁, CC₂)" 1603 is arranged as an output instruction "send (#B₁, CC₂)" 1615 in FIG. 16B.

The program of FIG. 16B achieves an operation of a data flow type in the distributed processing system of FIG. 1.

According to the embodiments described by reference to FIGS. 1 to 16, a program created by a programmer without paying attention to I/O operations of the program can be converted into a program operating in a manner associated with a data flow.

As a result, program codes respectively of I/O instructions and processing codes can be separated from the program, which minimizes a change that a program error may cause wrong information to be output or contents of an information storing medium are destroyed during an execution of the program.

Moreover, at an occurrence of a failure in the program, a position of the error can be easily localized, which facilitates replacement of the program.

Consequently, without imposing generation of a special program onto the programmer, there can be produced a program in which the reliability, expendability, and maintenance of the program are increased.

According to the present invention, in a creation of a program to be executed in a computer of a data flow type, various loads which have been imposed on the programmer can be mitigated.

Next, a description will be given in detail of a second embodiment in accordance with the present invention.

Figure 27:
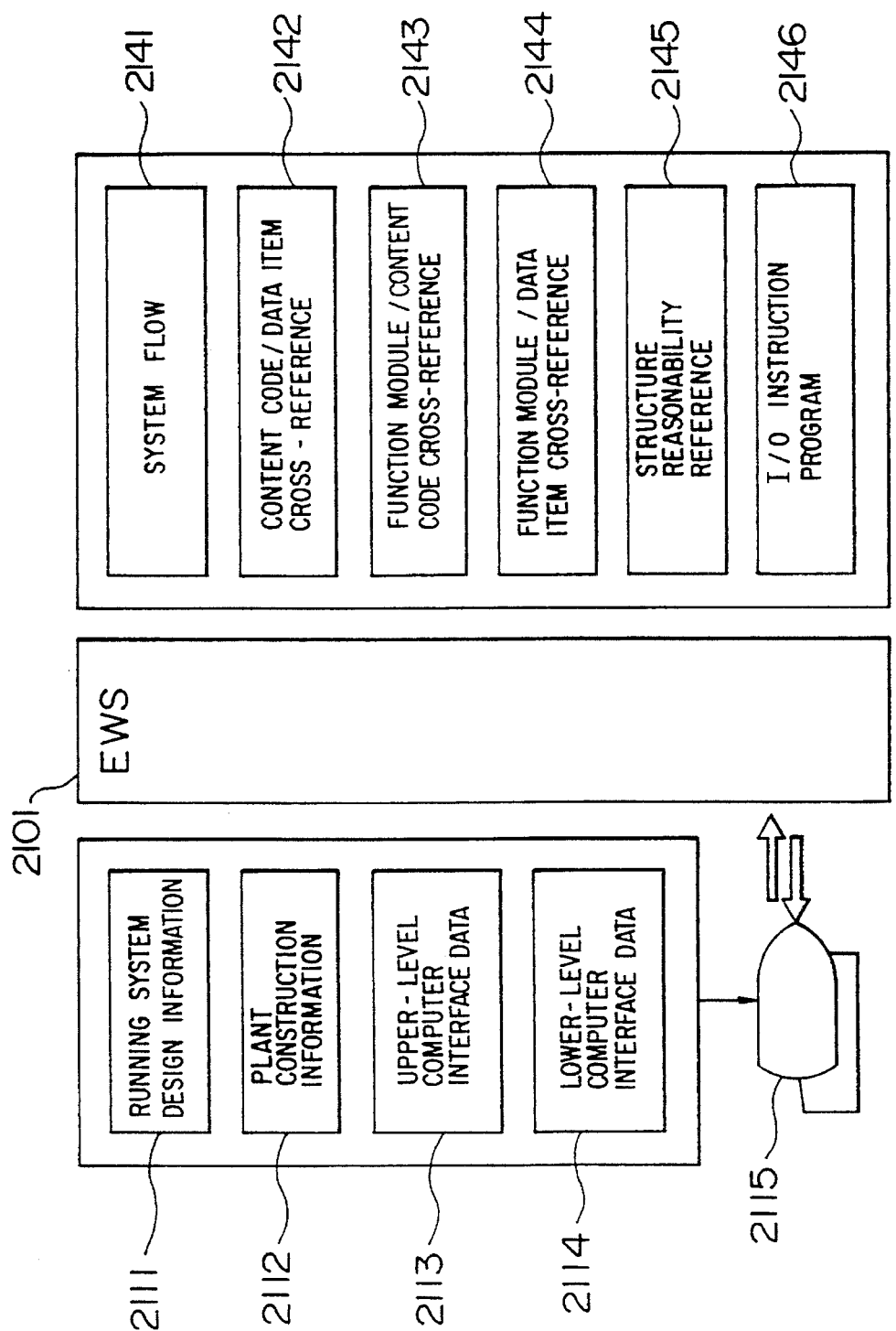
FIG. 27 is a diagram showing I/O data of the program development support processing apparatus according to the present invention.

FIG. 27 shows input/output data handled by the processors according to the present invention.

The configuration of FIG. 27 includes a support processing apparatus 2101 for supporting the generation and execution of a program according to the present invention and an I/O device 2115 including devices such as a keyboard and display. Data on the left and right sides of the support processing apparatus 2101 are input and output data, respectively. The support processing apparatus 2101 is supplied via the input device 2115 with running system design information 2111, plant construction information 2112, upper-level computer interface data 2113, and lower-level computer interface data 2114. In this regard, the running system design information or data 2111 is prepared by a system designer and includes data such as a system name and a length. The upper-level computer interface information or data 2113 include, e.g. in a case of a process control computer, data related to a production schedule and a system management. The lower-level computer interface data 2114 comprises data concerning a specific manufacturing process based on the production schedule, for example, data related to a method of opening and/or closing a valve. The output device 2115 presents on a display such data resultant from processing achieved on the input data by the processor 2101 as system flow data 2141, content code/data item cross-reference data 2142, function module/content code cross-reference data 2143, function module/data item cross-reference data 2144, structure reasonability reference data 2145, and data of I/O instructions of program 2145. In this connection, the system flow is different from a control flow representing a conventional flowchart of processing operations and includes a data flow representing contents of functions and specifications, respectively. In the system flow, functions denoting an outline of the system (described in an application language) are presented to upper-level elements in a tree-structure configuration; whereas, specific specifications (written in a programming language) are supplied to lower-level elements in the configuration. The other cross-reference data 2142 to 2144 are tables to be referenced from a point of view of each of the descriptions set forth above.

Next, a description will be given of the basic operation of the program development support conducted according to the present invention.

As set forth above, in the conventional program generation method, data are transferred through a shared table. In contrast thereto, according to the present invention, without adopting the shared table, data are directly broadcast for data transfers. Namely, the broadcast data may be received by any user in the system. Consequently, in accordance with the present invention, the operations such as an operation to write data in the table, an operation to read data therefrom, and an operation to notify a data address which are conventionally necessary when transferring data are unnecessary. Namely, on receiving data, a program need only immediately achieve processing on the data so as to output a result of the processing. As a result, according to the present invention, a job can be initiated at a position where data is received. Consequently, a program may be created only with I/O specifications. In this case, an internal processing part of the program need only be separately generated later.

In this regard, for a certain processing to be executed with content codes A, B, C, F1, and D, if data items respectively having the content codes A, B, and C are received, associated programs may be created only for the received data items. If a job cannot be conducted for the content code F1 unless the content codes A to D are present and processing is not produced for the content code D in an ordinary case, the processing related to the content code F1 and the processing associated with the content code D are separately generated, which leads to an inconsistency therebetween. Consequently, according to the method above, it is essential to retain consistency therebetween.

Figure 17:
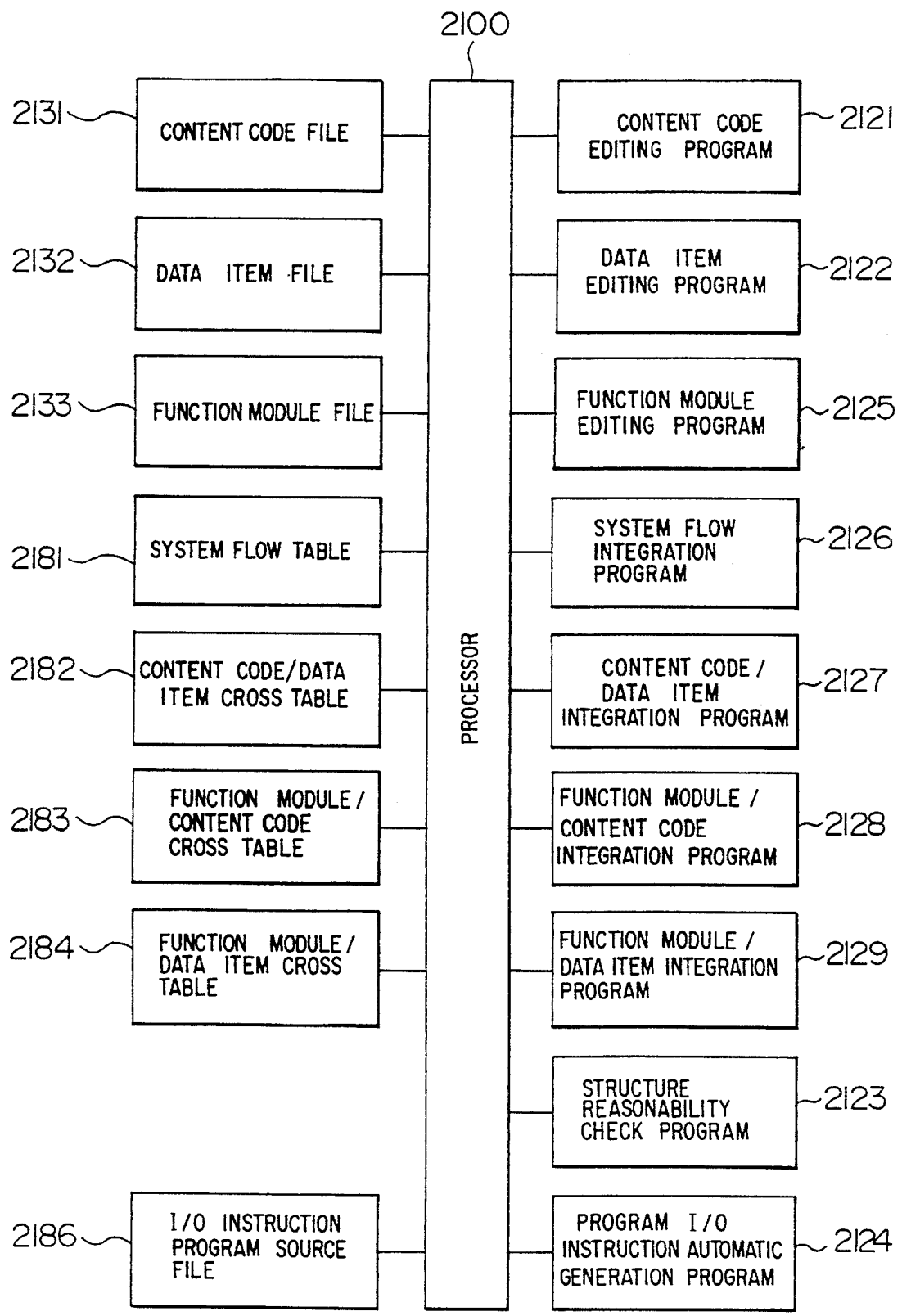
FIG. 17 is a schematic diagram showing files, tables, and programs adopted in a program development support processing apparatus in which a second embodiment of the program processing method is implemented according to the present invention.

FIG. 17 shows files, tables, and programs utilized in the program development processing apparatus 2100 according to the present invention.

The processor 2100 is provided with a group of input data files including a content code file 2131, a data file 2132, and a function module file 2133. There is also provided a group of tables comprising a system flow table 2181, a content code/data item cross table 2182, a function module/content code cross table 2183, and a function module/data item cross table 2184.

The group of input data files are created by such programs disposed in the system as a content code editing program 2121, a data item editing program 2122, and a function module editing program 2125.

Moreover, the group of tables are produced by a set of programs including a system flow integration program 2126, a content code/data item integration program 2127, a function module/content code integration program 2128, and a function module/data item integration program 2129.

In addition, the configuration includes a structure reasonability check program 2123 for conducting a check of a module structure and a program I/O instruction automatic generation program 2124 for generating an I/O instruction program source file 2186.

The processor 2100 of FIG. 17 edits input data to generate; based on the content code editor program 2121, the data item editor program 2122, and the function code module editor program 2125; the content code file 2131 representing contents of data items in a form of a set, the data item file 2132 storing therein such attributes of respective data items as a length, a type, a value range, and a name; and the function module file 2133 in which external specifications of each module are represented with names thereof and content codes of I/O data thereof.

Thereafter, the design information integration program 2126 is executed to produce as outputs, as shown in FIG. 27, the content code/data item cross-reference 2142, the function module/content code cross-reference 2143, the function module/data item cross-reference 2144, and the system flow diagram 2141.

The program instruction automatic generation program 2124 is executed to create I/O instructions of program from the content code file 2131, the data item file 2132, and the function module file 2133. The obtained I/O instructions constitute a program of I/O instructions, which is the final object to be generated according to the present invention.

FIG. 18 shows in detail the content code file of FIG. 17.

The content code file 2131 includes a content code 2021 denoting a code assigned to data item names 2023 corresponding to a data item count 2022. This format is repeatedly generated for each content code 2021. The content code 2021 represents such items as a management schedule, a tracking method, and a stock management. The item is further subdivided into more concrete items for implementation thereof, namely, data items (designating e.g. a temperature control, a speed increase, and a valve operation) associated with the respective content codes 2021.

FIG. 19 shows in details the data item file of FIG. 17.

The data item file 2132 includes file elements each comprising, for each data item name 2031, information items representing attributes thereof such as a data unit length 2032, an array element count 2033, a data code 2034, and a sign presence/absence indication 2035. Namely, this format appears repeatedly for each data item name 2031 in the file 2132.

Figure 20:
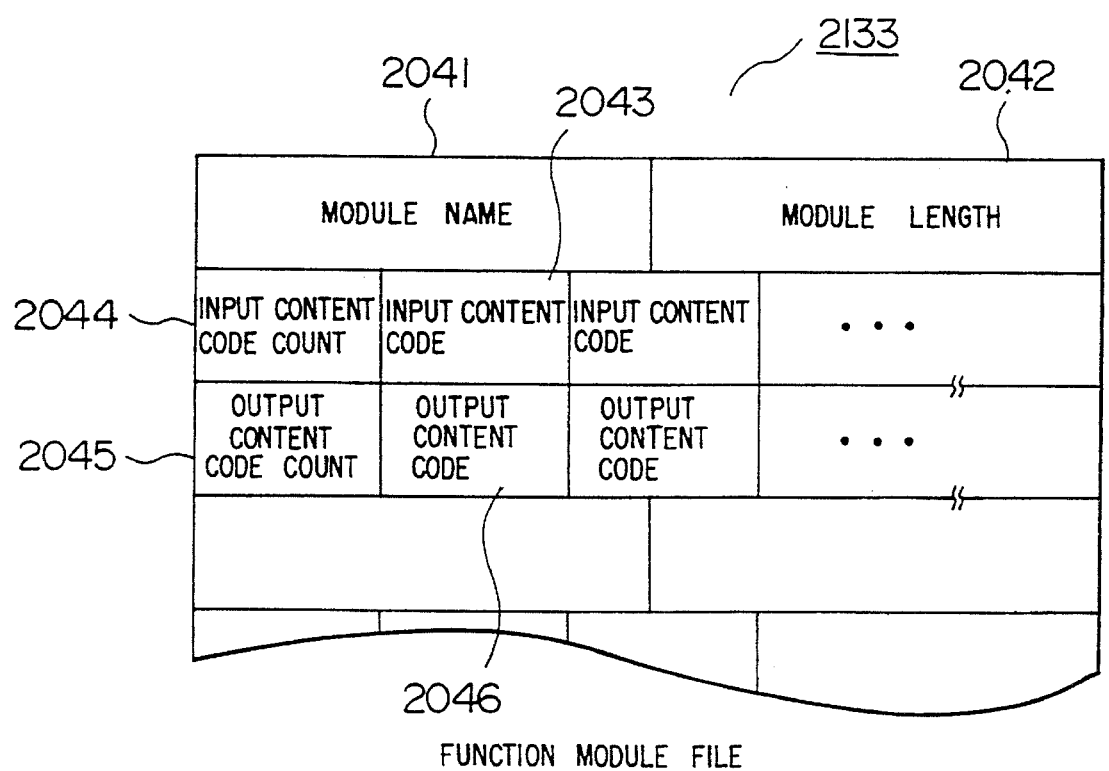
FIG. 20 is a diagram showing in detail a function module file of FIG. 17.

FIG. 20 shows details about contents of the function module file 2133 of FIG. 17.

The function module file 2133 is loaded with a module name 2041, a module length 2042, an input content code count 2044, an output content code count 2045 input content codes 2043, and output content codes 2046 The module length 2042 denotes a length of a program represented by the module name 2041. The number of input content codes 2043 necessary as inputs to the module are designated by the input content code count 2944. In addition, the output content code count 2045 indicates the number of output content codes 2046 recorded in the file 2133.

FIG. 21 shows in detail the content code/data item cross-reference of FIG. 27.

In this figure, abbreviations of the content code 2021 of FIG. 18 i.e. YOOS4, YB1002, YB2003, etc. are arranged along the horizontal direction, whereas, the data item names 2031 of FIG. 19 such as bftoadr, coildie, coildii, and coilno are designated along the vertical direction. In this map, relationships existing between content codes 2021 and data item names 2031 are denoted with asterisks. Content codes 2021 are associated with upper-level functions, for example, a management schedule, a production plan, and a tracking scheme. Data item names 2021 specify data items related to lower level functions such as a specific action to be adopted in an actual execution of the management schedule, a manufacturing process matching the production plan, and a valve opening/closing operation conforming to the tracking scheme.

As a result of examination through contents of the content code/data item cross-reference 2142, when there exist different content codes 2021 respectively related to the data item names 2031 entirely matching each other, an alarm message is displayed to notify a chance of a duplicated definition. For example, for the content code YD3B1 associated with data items including 3 coilno, 8 cc, 17 saisoid, and 1928 bcc, if there is found a content code related with the same constituent data items, the double definition alarm is presented on the display.

FIG. 22 shows details about contents of the function module/content code cross-reference 2143 of FIG. 27. In this diagram, abbreviations of module names 2041 i.e. A—A DRS RC, A–I COW RK, etc. are arranged along the horizontal direction; whereas, abbreviations of content codes 2021 such as YOOS4 and YB1O02 are presented along the vertical direction. Letters I and O are respectively specified for the output and input content codes 2043 and 2046 related to the module name 2041. When there exist different module names 2041 respectively having content codes 2021 each associated with the input and output content codes 2043 and 2046 respectively matching each other, an alarm message is displayed to notify a change of a duplicated definition.

FIG. 23 shows in detail the function module/data item cross-reference 2144 of FIG. 27.

In this diagram, abbreviations of module names 2041 such as A—A DRS RC and A–I COW RK are arranged along the horizontal direction; whereas, designations of data item names 2031 including bftoadr, coildie, etc. are presented along the vertical direction. In this map, letters I and 0 are respectively specified when the data item name 2031 denotes input and output data for the module name 2041.

Figure 24:
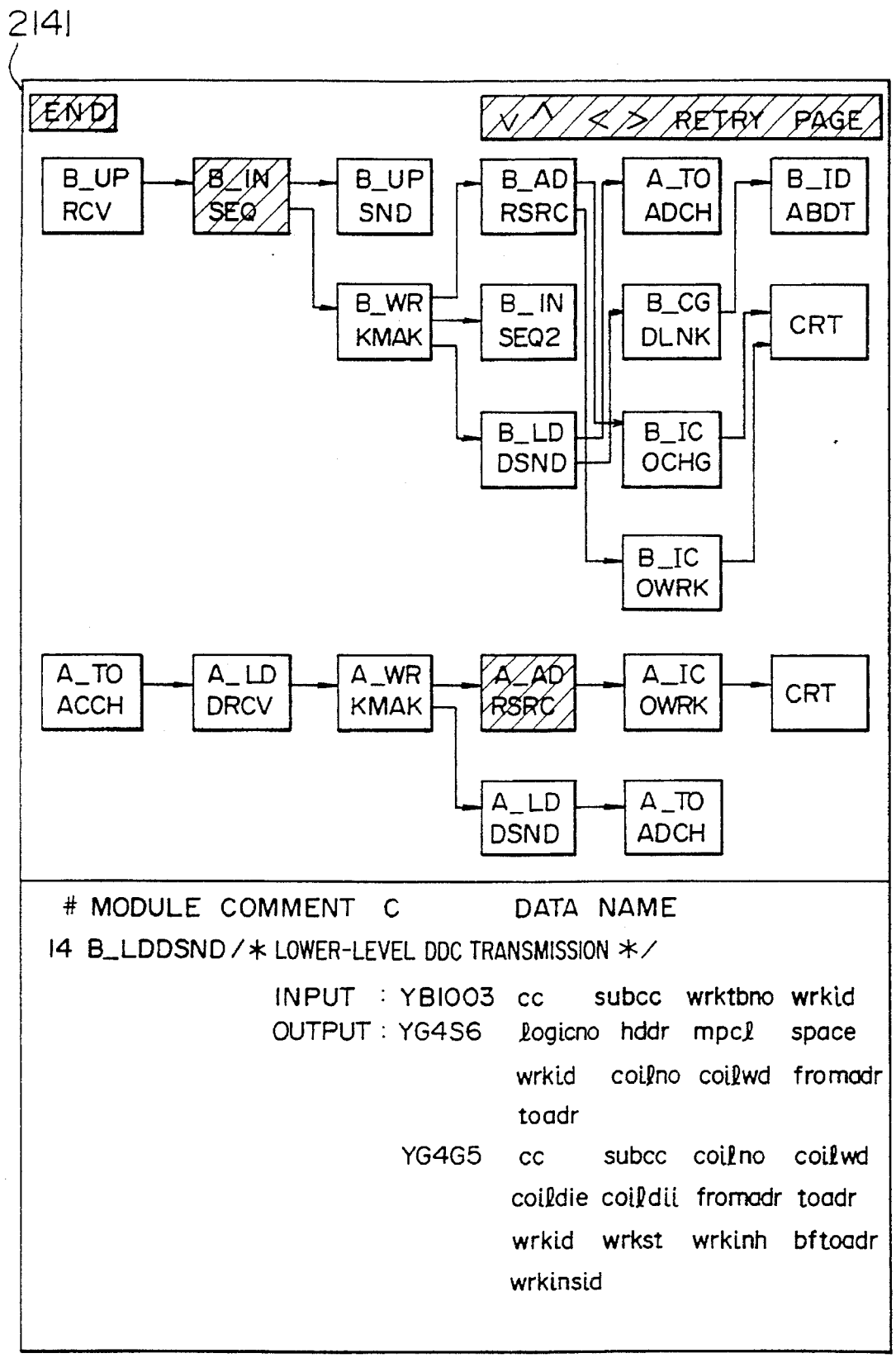
FIG. 24 is a diagram showing in detail the system flowchart of FIG. 27.

FIG. 24 shows details about the system flow diagram of FIG. 27.

In this configuration, a rectangular frame designates a module with an abbreviation of a module name 2041 thereof denoted therein. An arrow indicates a content code 2021. A module as a root of the arrow adopts the content code 21 as an output content code 2046 (FIG. 20). Namely, the output content code 2046 is displayed at a lower position in the diagram. A module as the destination of the arrow utilizes the content code 2021 as an input content code 2043 (FIG. 20). When a rectangular frame is specified, the system displays in the lower portion of the display, for the specified module, the input content code 2043 (UB1003), the output content codes 2046 (YG4S6 and YG4G), and the data item names 2031 (subcc, wrktbno, etc.) belonging to the output content code 2046.

Figure 25:
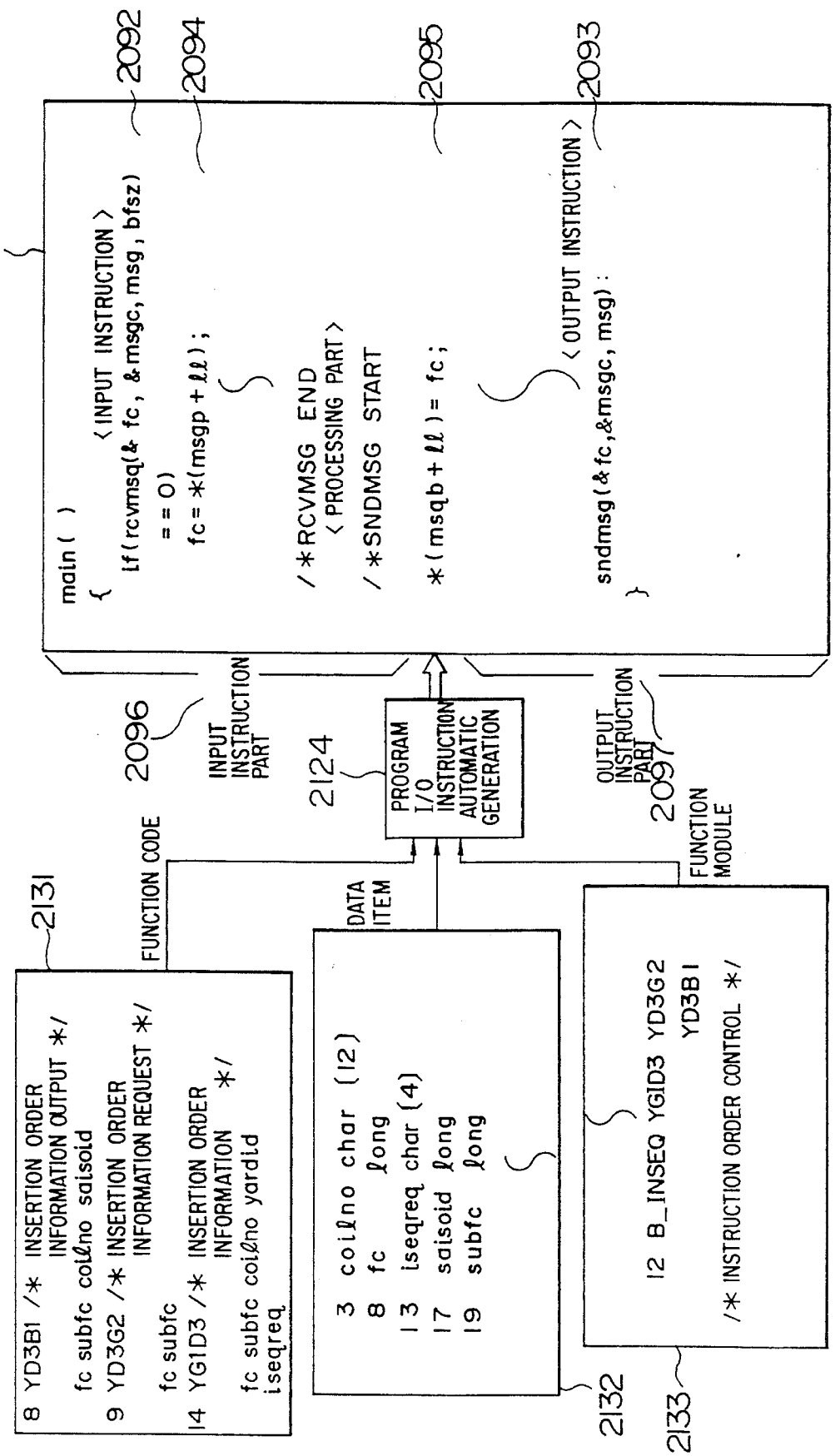
FIG. 25 is an explanatory diagram for explaining the processing of the program for automatically generating I/O instructions in a program of FIG. 17.

FIG. 25 shows in detail the program I/O instruction automatic generation processing of FIG. 17.

The constitution of FIG. 25 includes a function code file 2131, a data item file 2132, a function module file 2133, a program I/O automatic generation program 2124, and an I/O specification program 2091. The I/O specification program 2091 comprises an input instruction part 2096 and an output instruction part 2097.

The program I/O instruction automatic generation program 2124 acquires from the function module file 2133 an input content code 2043 and an output content code 2046 (FIG. 20) related to a specified module to conduct a retrieval through the function code file 2131 with an associated content code 2121 (FIG. 18) set as a retrieval key, thereby obtaining data item names 2031 (FIG. 19) related thereto. Next, attributes associated with the data item names 2031 are acquired from the data item name file 2132. Namely, based on the attributes (FIG. 19) represented with the data unit length 2032, the array element count 2033, the data code 2034, and the sign assignment presence/absence indication 2035, an input instruction 2092 of the I/O specification program 2091 is executed to obtain data. Using the obtained data, the program 2091 creates input data disassemble instruction 2094 according to the attributes for each input data item name 2031, namely, the data unit length 2032, the array element count 2033, the data code 2034, and the sign assignment indication 2035, thereby developing the input instruction part 2096. Moreover, in order to output data according to an output integration instruction 2093 of the I/O specification program 2091, there is employed the output instruction part 2097 achieving a process to integrate output operations based on the attributes for each output data item name 2031. In this regard, the input instruction part 2096 achieves processing to disassemble groups of operations into smaller-size groups of operations, whereas the output instruction part conducts processing to assemble separated operations into appropriate groups of operations.

Figure 26:
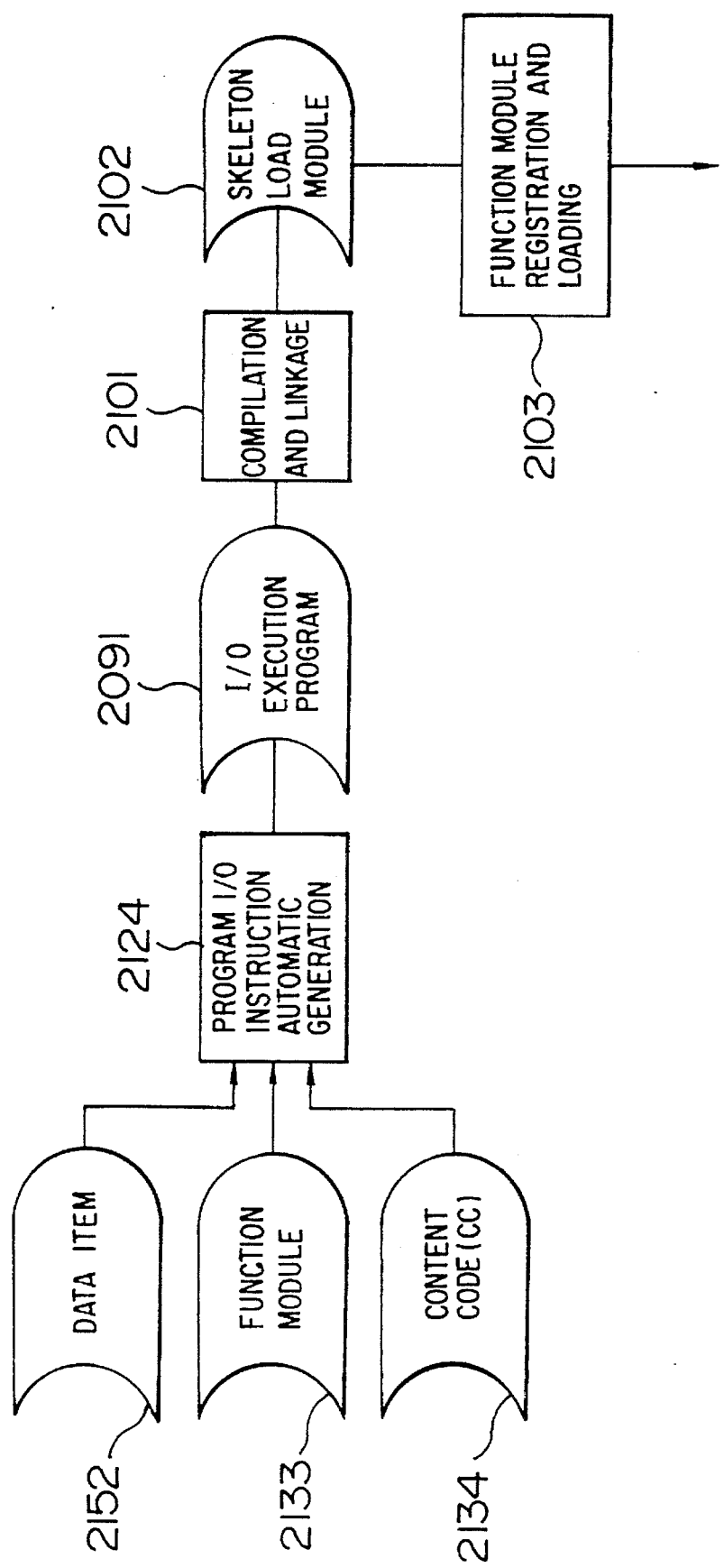
FIG. 26 is a diagram showing a procedure up to an operation of an I/O specification program of FIG. 27.

FIG. 26 shows a process of operations up to an initiation of the I/O specification program 2091.

Information necessary for a creation of an I/O specification program 2091 is acquired from the data item file 2132, the function module file 2133, and the content code file 2134. The program I/O instruction automatic generation 2124 is then executed to process the attained information so as to create an I/O specification program 2091. Thereafter, the compilation and linkage processing 2101 processes the program 2091 to produce an executable module 2102. The function module registration and storage processing 2103 then registers and stores the module 2102 for alter execution of the module 2102. In this regard, the compilation and linkage processing 2101 carries out a compilation to translate the program 2091 into a program represented in a computer or machine language and then conducts a program linkage to convert the obtained program into a unit executable by the computer. A skeleton load module 2102 includes only input and output instructions, namely, there is not included any internal processing.

Figure 28:
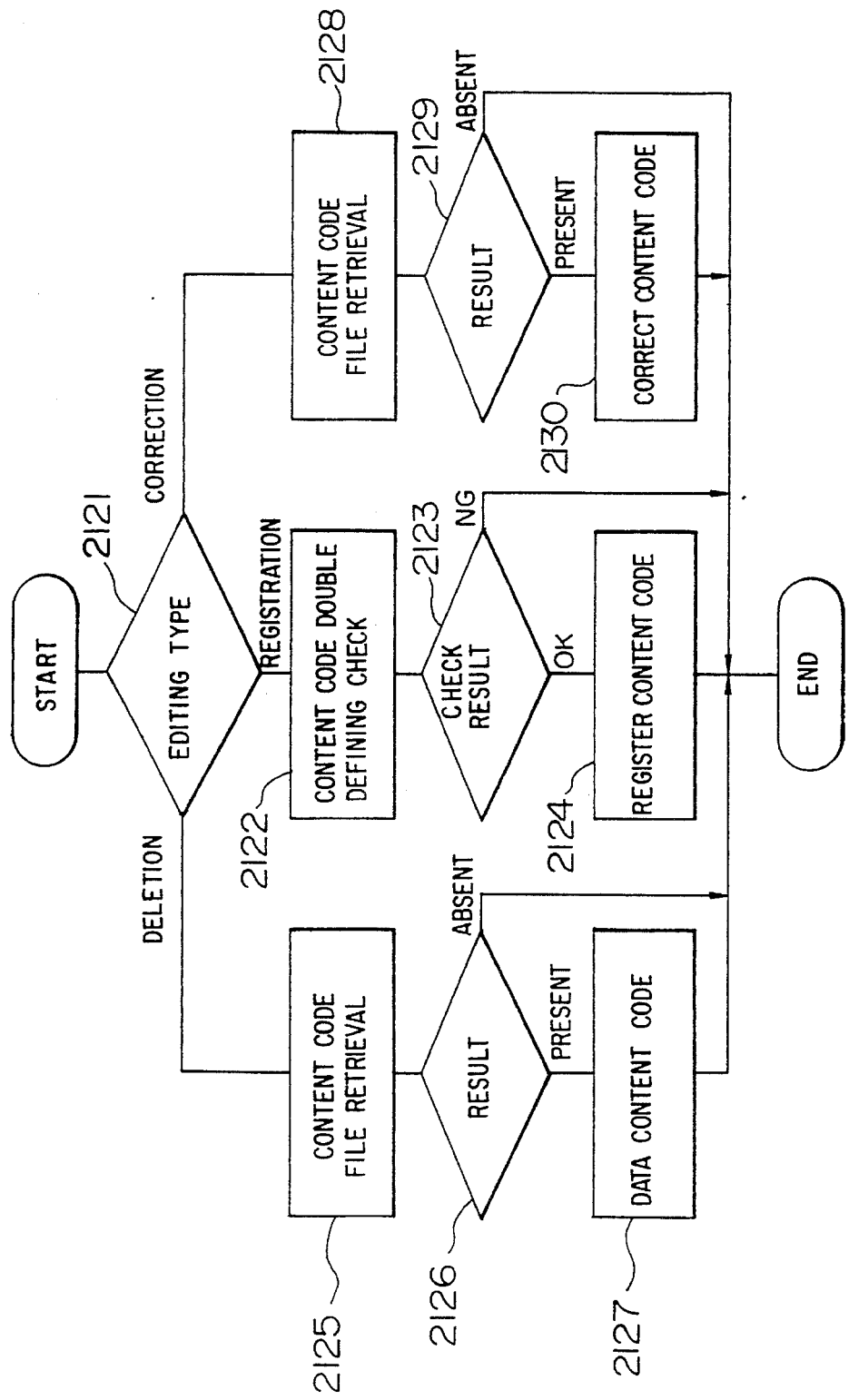
FIG. 28 is a flowchart showing the processing procedure of a content code editing program of FIG. 17.

FIG. 28 is a flowchart showing the processing procedure of the content code editing or editor program 2121 of FIG. 17.

In the content code editor program 2121, an editing type is first determined (step 2121). For a new registration, a retrieval is made through the content code file 2131 to achieve a duplication check to determine whether or not the registration data has already been registered to the file 2131 (step 2122). If this is not the case, the data is registered to the content code file 2131 (steps 2123 and 2124). If the data has already been registered (step 2123), the processing is terminated in this state. If the editing type indicates a correction, a retrieval is achieved through the content code file 2131 to conduct a check in a similar manner as for the registration (step 2128). If an objective location is found in the content code file 2131 (step 2129), contents of the location are corrected (step 2130). For the editing type specified as a deletion, a retrieval is carried out through the content code file 2131 to attain objective data (step 2125) to conduct the same check as above. If the objective data is found (step 2126), the content code is deleted from the file 2131 (step 2127).

Figure 29:
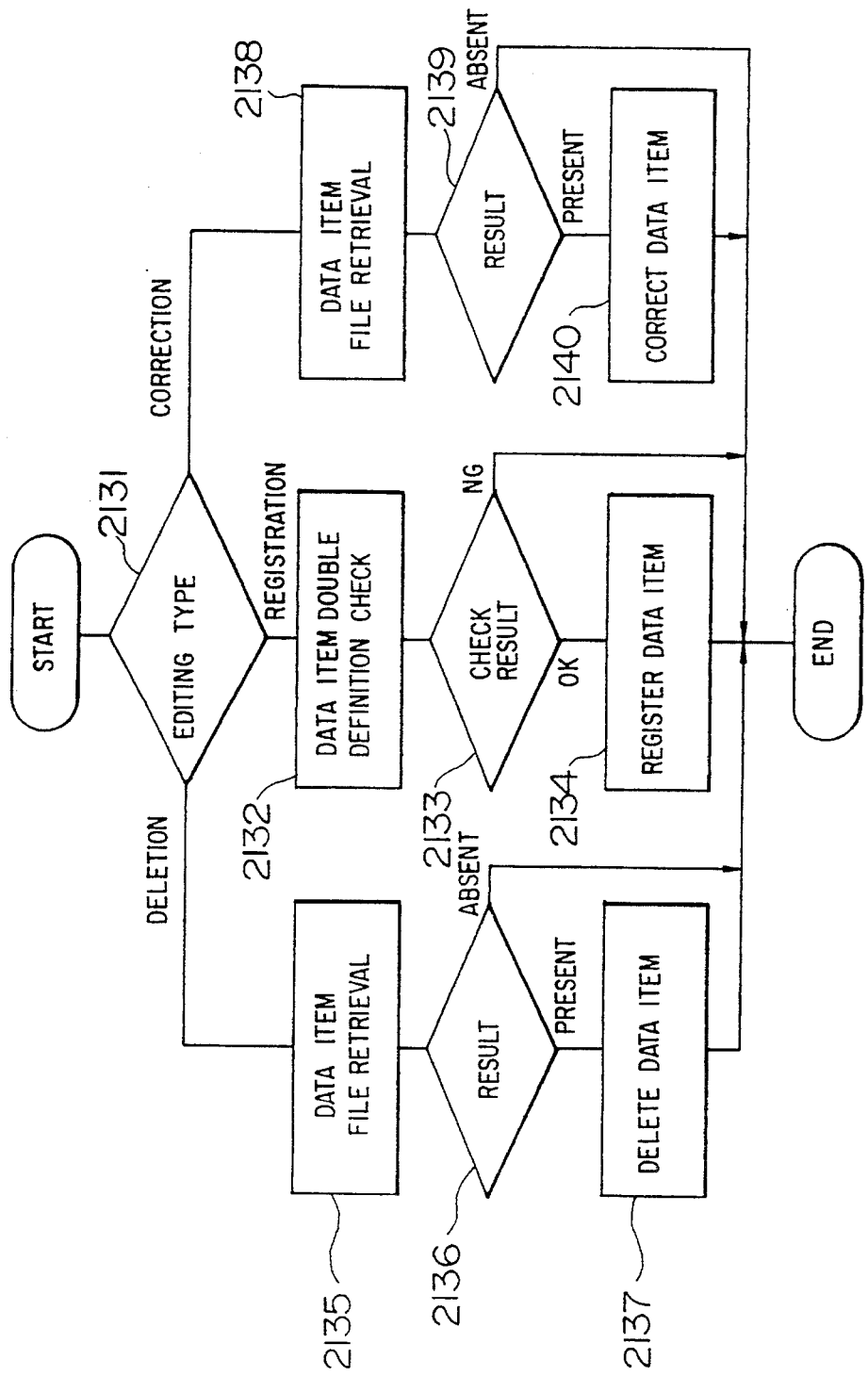
FIG. 29 is a flowchart showing the processing procedure of a data item editing program of FIG. 17.

FIG. 29 is a flowchart showing the processing procedure of the data item editor program 2122 of FIG. 17.

An editing type is first decided (step 2131). If the type is a new registration, a retrieval is accomplished on the data item file 2132 to conduct a duplicated definition check for the registration data (step 2132). If this is not the case (step 2133), the data is registered to the data item file 2132 (step 2134). If a duplicated definition is found, (step 2133), the processing is finished in this state. When the editing type indicates a correction, a retrieval is achieved through the data item file 2132 (step 2138) to conduct a check in a similar manner as for the registration. If an objective location is found in the data item file 2132 (step 2139), contents of the location are corrected (step 2140). For the editing type specified as a deletion, a retrieval is carried out through the data item file 2132 to attain objective data (step 2135). If the objective data is found (step 2136), the data is deleted from the file 2132 (step 2137).

Figure 30:
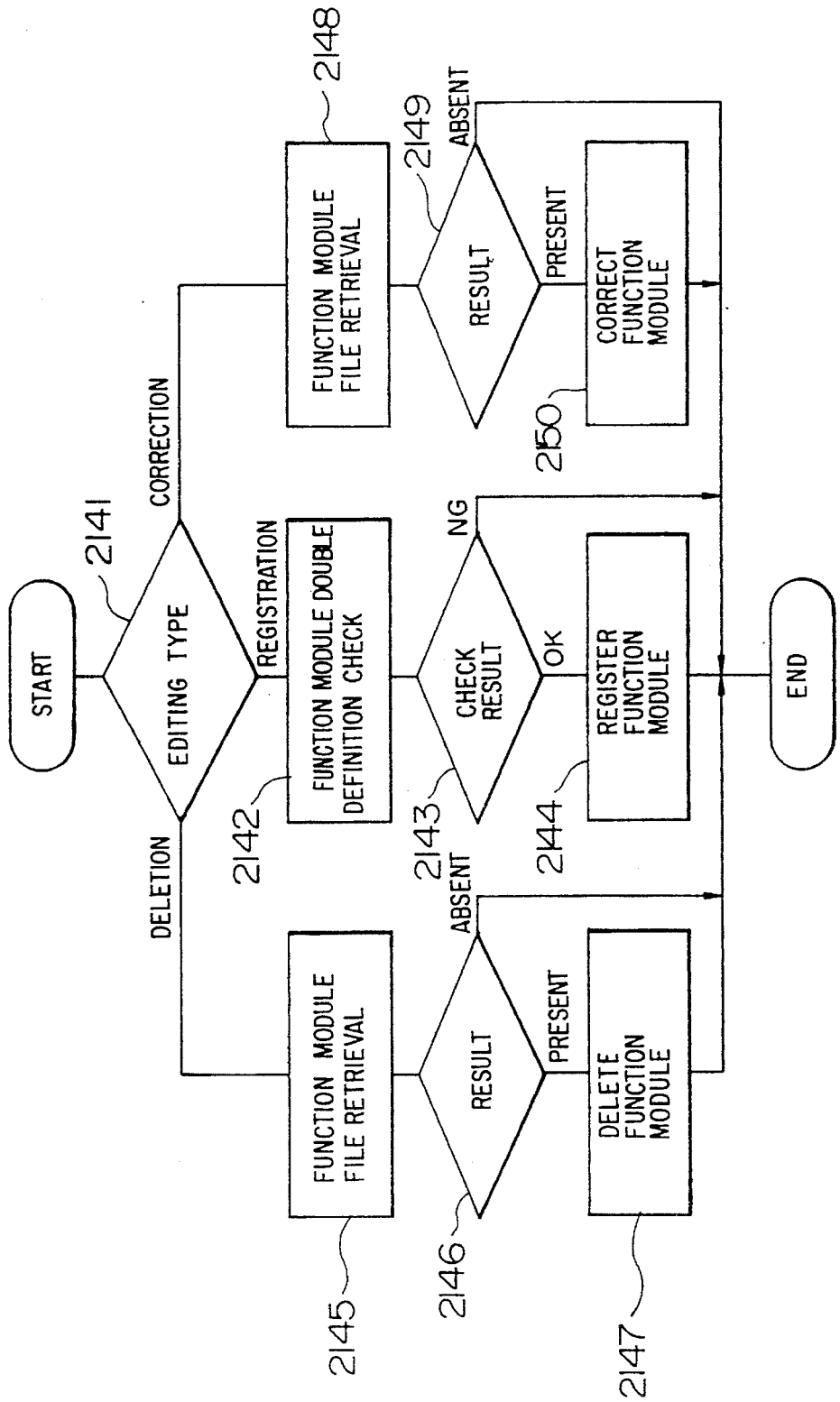
FIG. 30 is a flowchart showing the processing procedure of a function module editing program of FIG. 17.

FIG. 30 is a flowchart showing the processing procedure of the function module editor program 2125 of FIG. 17.

In this program 2125, an editing type is first determined (step 2141). If the type is a new registration, a retrieval is achieved on the function module file 2133 to conduct a check for a duplicated definition of the registration data (step 2142). If this is not the case (step 2143), the data is registered to the function module file 2133 (step 2144). If a duplicated definition is found (step 2143), the processing is finished in this state. When the editing type indicates a correction, a retrieval is achieved through the function module file 2133 (step 2148) to carry out a check in a similar manner as above. If data to be corrected is found in the file 2133, the data is corrected therein (step 2150).

For the editing type specified as a deletion, a retrieval is carried out through the function module file 2133 to attain objective data (step 2145). If the objective data is present (step 2146), the data is deleted from the file 2133 (step 2147).

FIG. 31 shows contents of the system flow table 2181 of FIG. 17.

When a system flow is displayed, the system flow table 2181 is loaded with a header part including a page number 2811 thereof, a column number 2812 in the page, and a related function module count 2813 of modules to be described in the column. For each related function module name 2814, there are described after each header part an input content code count 2815, input content codes 2816, an output content code count 2817, and associated output content codes 2818.

FIG. 32 shows contents of the content code/data item cross table 2182 of FIG. 17.

The content code/data item cross table 2182 comprises elements each including a data item name 2821, a content code count 2822 associated therewith, and related content code names 2823.

FIG. 33 shows contents of function module/content code cross table 2183 of FIG. 17.

The function module/content code cross table 2183 is constituted with elements each comprising a function module name 2835 and associated items such as an input content code count 2831, input content codes 2832, an output content code count 2833, and output content codes 2834.

FIG. 34 shows contents of the function module/data item cross table 2184 of FIG. 17.

The function module/data item cross table 2184 comprises elements each including a function module name 2841 and associated items such as an input data item count 2842, input data item names 2843, an output data item count 2844, and output data item names 2845.

FIG. 35 shows contents of the I/O instruction program source file 2186 of FIG. 17.

The I/O instruction program source file 2186 is constituted with elements each comprising a program name 2861 and a program length 2862 associated therewith.

Figure 36:
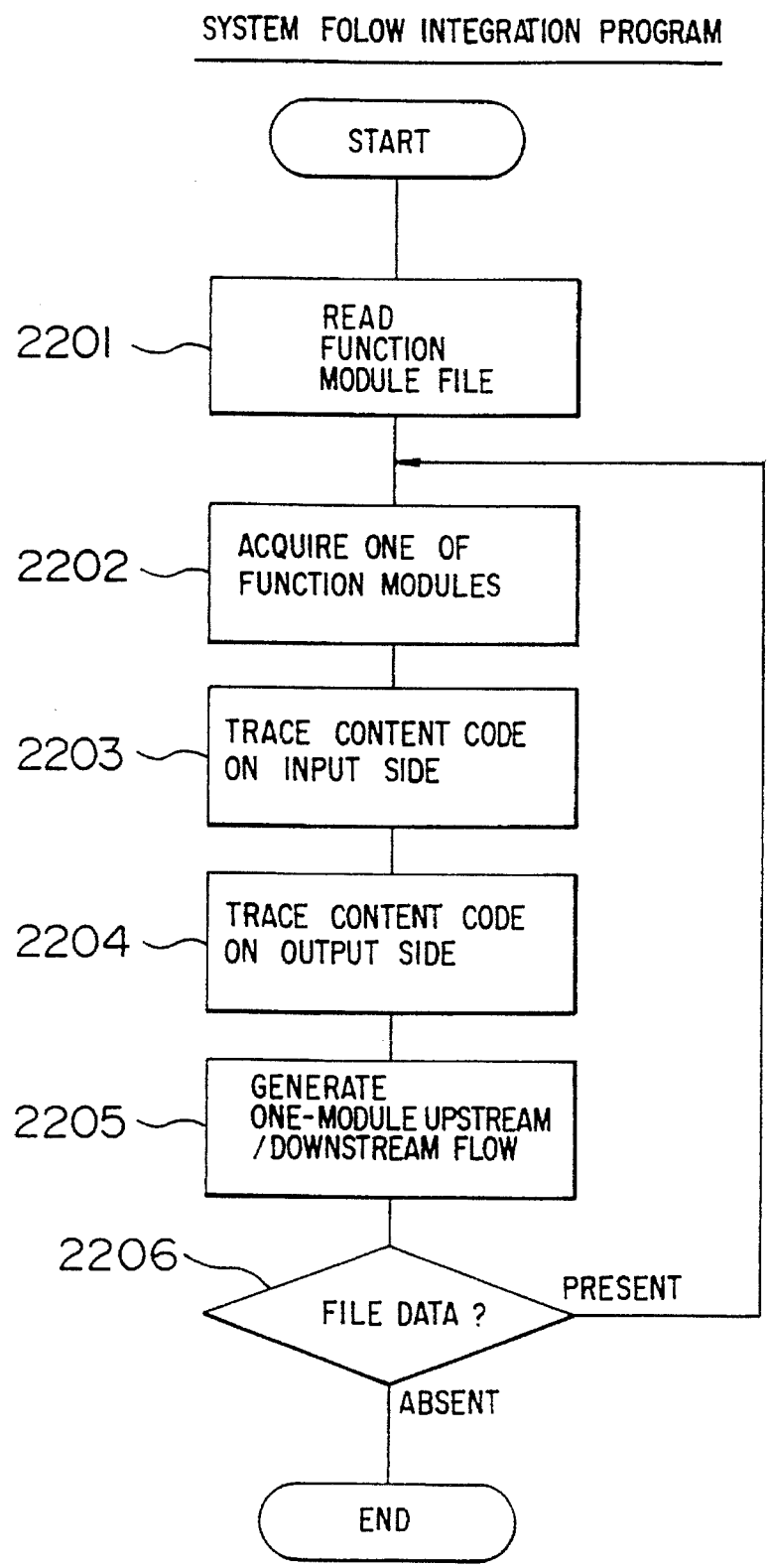
FIG. 36 is a flowchart showing the processing procedure of a system flow integration program of FIG. 17.

FIG. 36 is a flowchart showing the processing procedure of the system flow integration program 2126 of FIG. 17.

This program 2126 reads the function module file 2133 (step 2201) to acquire data of a function module (step 2202). A trace operation is conducted with an input content code thereof (step 2203) to continuously detect function modules outputting the input content code until the file data are completely processed (step 2206). Subsequently, a trace operation is similarly accomplished with an output content code to detect function modules inputting the output content code. The operations above are sequentially executed from a function module inputting an output content code and then for a function module inputting an output from the function module in a repetitious manner (step 2204) until the file data are completely processed (step 2206). In this manner, for a function module, an upstream flow and a downstream flow are produced through an editing operation (step 2205).

Figure 37:
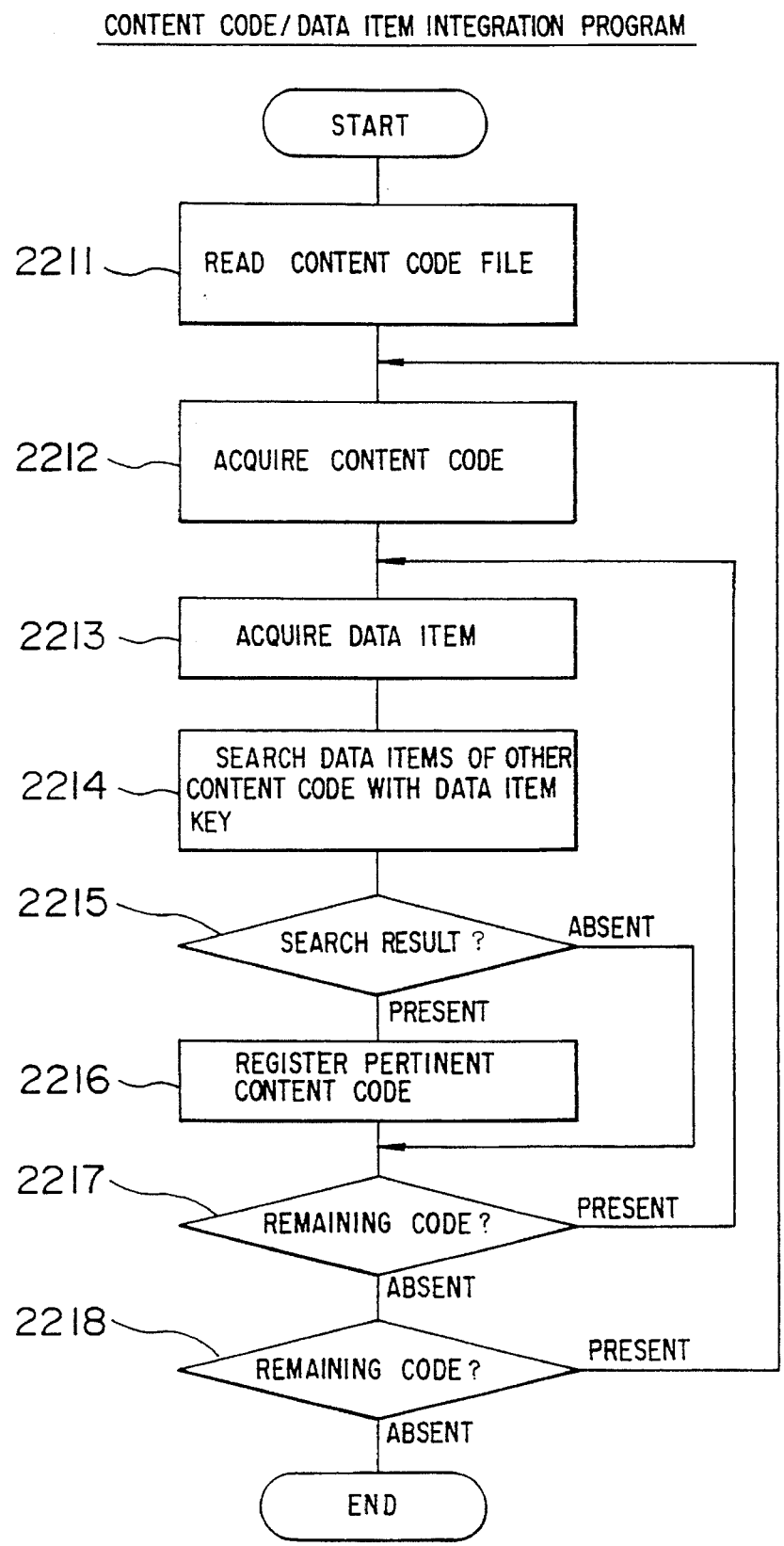
FIG. 37 is a flowchart showing the processing procedure of a content code/data item integration program of FIG. 17.

FIG. 37 is a flowchart showing the processing procedure of the content code/data item integration program 2127 of FIG. 17.

The program 2127 first reads the content code file 2131 (step 2211) to attain content code data (step 2212) so as to acquire content code data (step 2213). A check is made through data items of other content codes to determine presence or absence of a data item having the same name (step 2214). If such an item is present (step 2215), it is registered that the pertinent data item belongs to the acquired content code and to the content code resultant from the check (step 2216). This operation is accomplished for each data item associated with each content code (steps 2217 and 2218), thereby creating the content code/data item cross table 2183.

Figure 38:
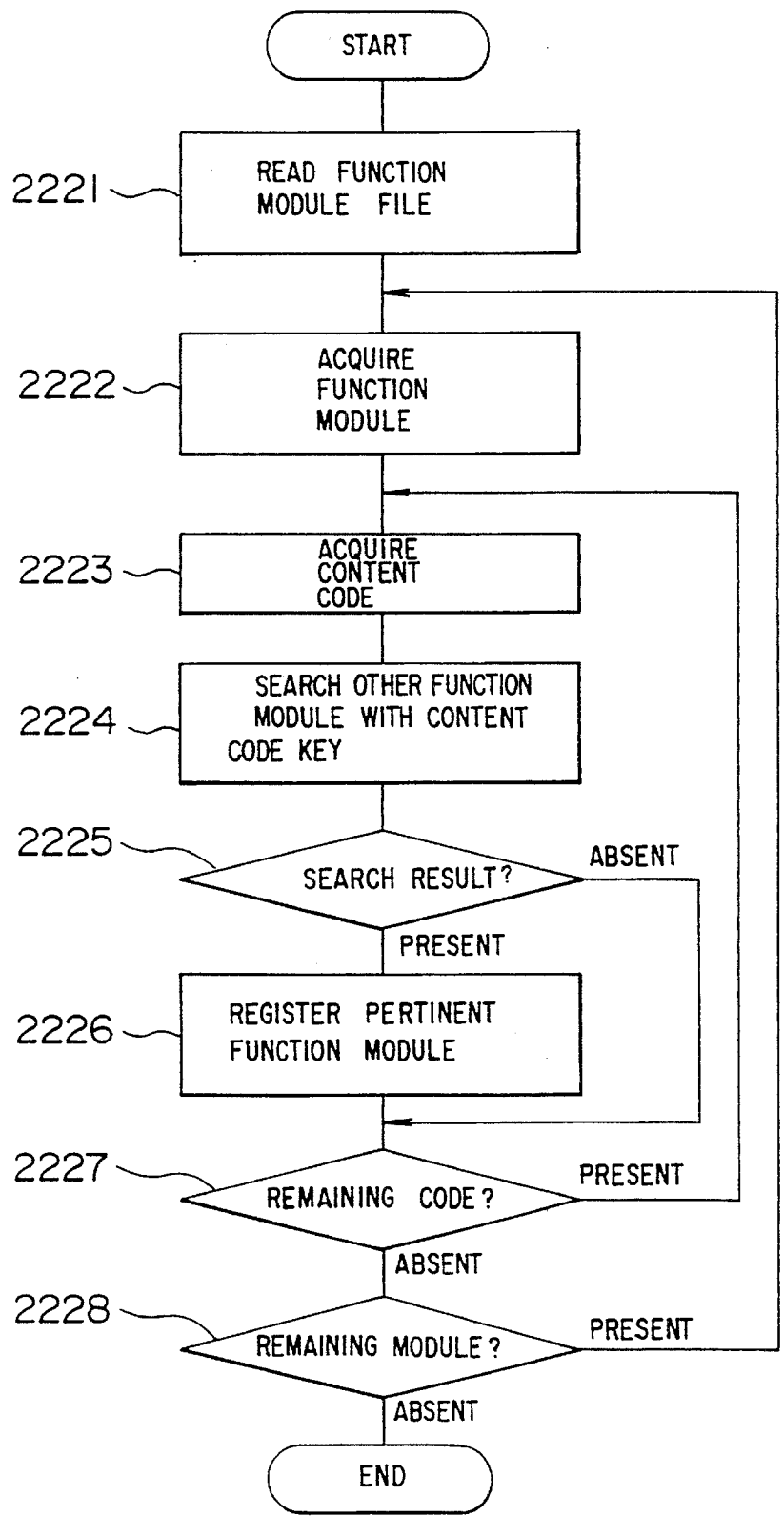
FIG. 38 is a flowchart showing the processing procedure of a function module/content code integration program of FIG. 17.

FIG. 38 shows the processing procedure of the function module/content code integration program 2128 of FIG. 17.

The program 2128 first read the function module file 2133 (step 2221) to acquire a function module (step 2222). A content code is attained from I/O content codes of the modules (step 2223) to make a search so as to decide whether or not the content code has already been set as an I/O content code of another function module (step 2224). If this is the case as a result of the search (step 2225), it is registered that the content code belongs to the function modules thus detected (step 2226). The processing is repeatedly achieved for the I/O content codes of each function module (steps 2227 and 2228) to produce the function module/content code cross table 2183.

Figure 39:
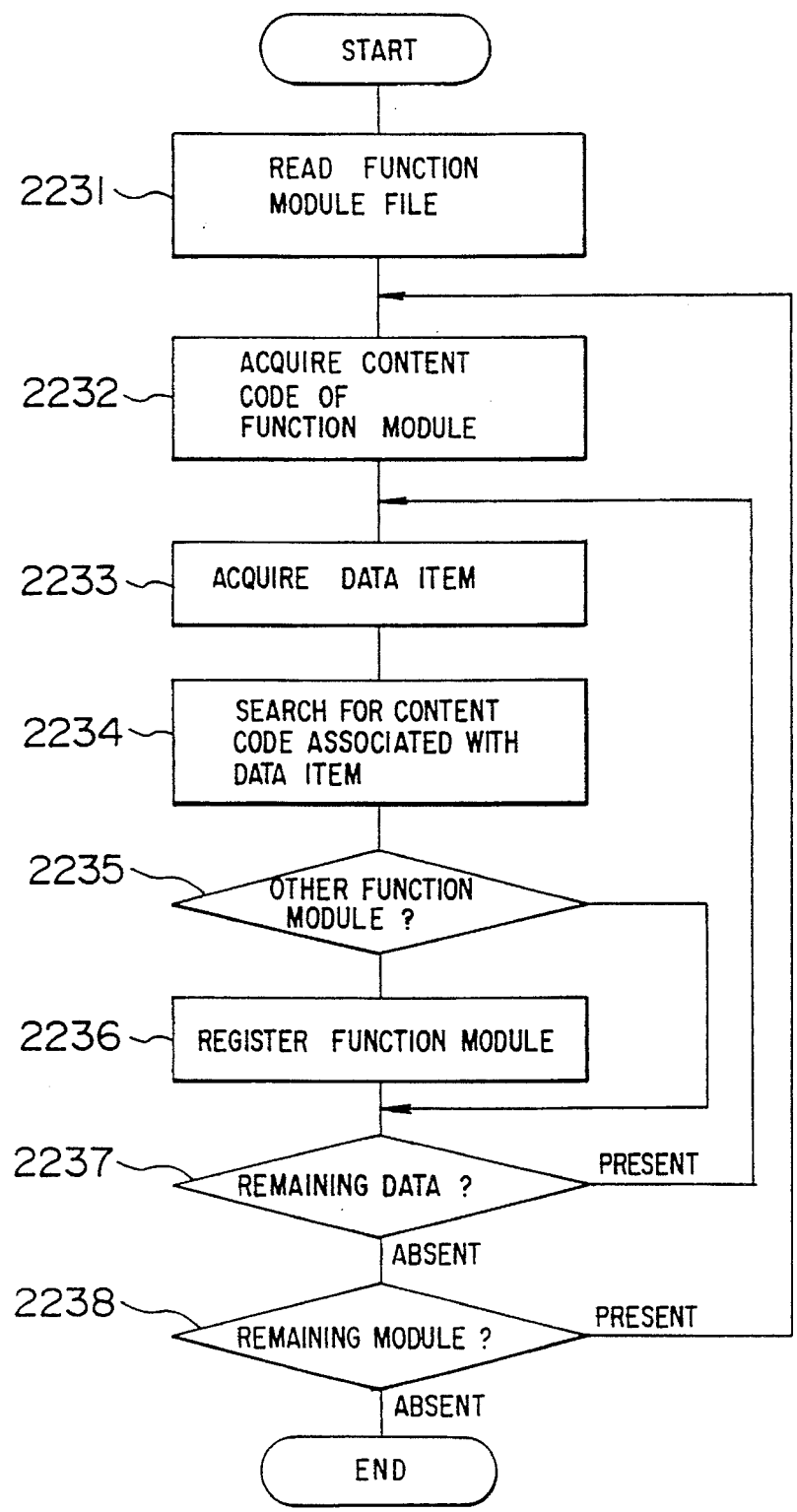
FIG. 39 is a flowchart showing the processing procedure of a function module/data item integration program of FIG. 17.

FIG. 39 shows the processing procedure of the function module/data item integration program 2129 of FIG. 17.

This program 2129 first reads the function module file 2133 (step 2331) to attain a data item belonging to an I/O content code thereof (steps 2232 and 2233). A retrieval is made to acquire a content code associated with the data item (step 2234). Moreover, a retrieval is conducted to detect other function modules having the content code as an I/O content code (step 2235). The operation above is repeatedly carried out for all I/O data items of the respective function modules (steps 2237 and 2238) to generate the function module/data item cross table 2184.

Figure 40:
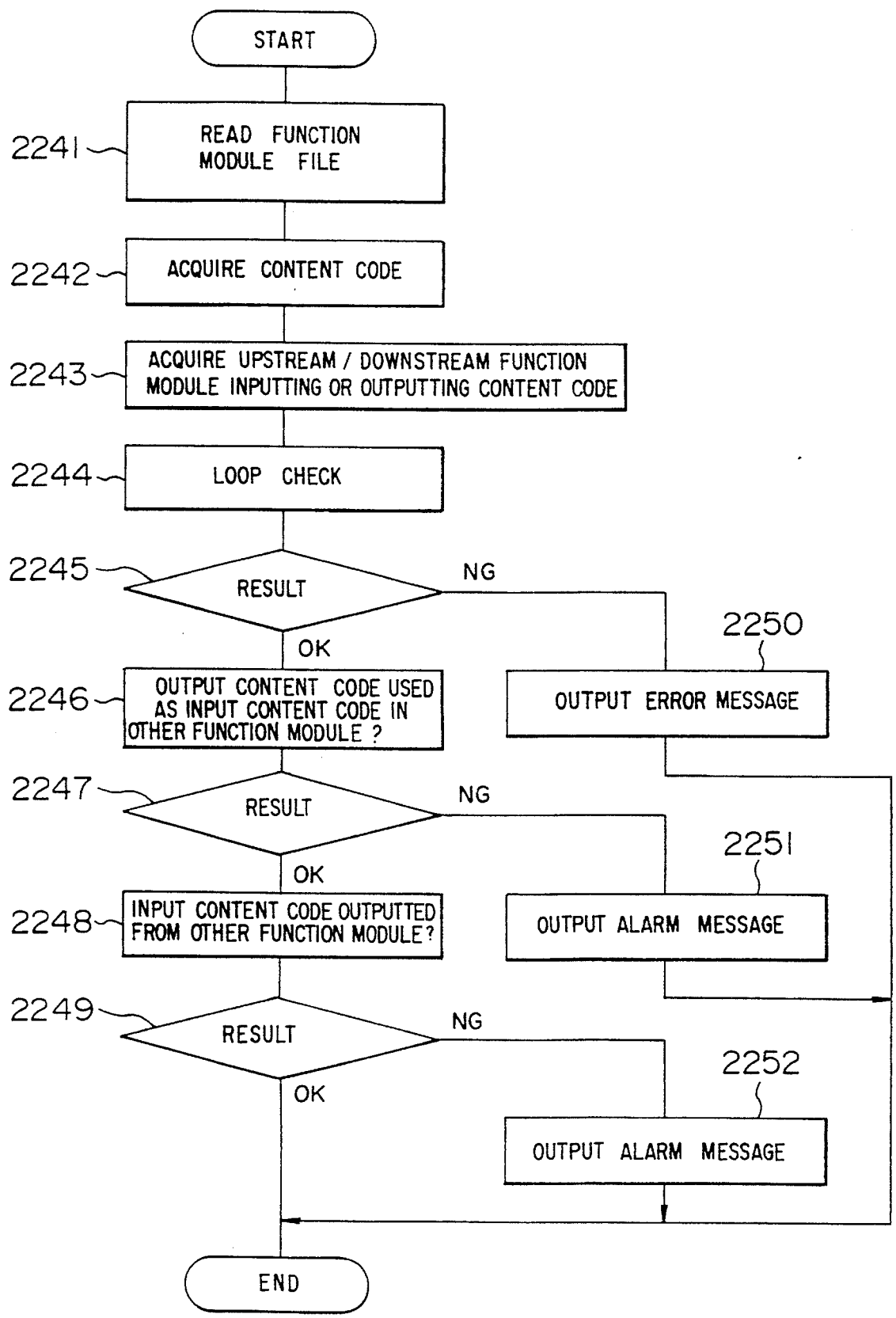
FIG. 40 is a flowchart showing the processing procedure of a structure reasonability check program of FIG. 17.

FIG. 40 is a flowchart showing the processing procedure of the structure reasonability check program 2123 of FIG. 17.

In this program 2123, a read operation is first achieved on the function module file 2133 (step 2241) to attain an I/O content code (step 2242). A trace operation is carried out with the content code to determine upstream and downstream function modules (step 2243) to achieve a loop check, thereby determining whether or not an identical function module appears two times or more (step 2244). If this is the case (step 2245), an error message is output (step 2250). Subsequently, a check is made to decide whether or not an output content code of the function module is adopted as an input content code of another function module (step 2246). If the output content code is not used as an input content code (step 2247), an alarm message is output to notify that the output is not used (step 2251). Next, a check is conducted to determine whether or not another function module outputs the input content code of the function module (step 2248). If this is not the case (step 2249), an alarm message is output to report that the input has not been produced (step 2252).

Figure 41:
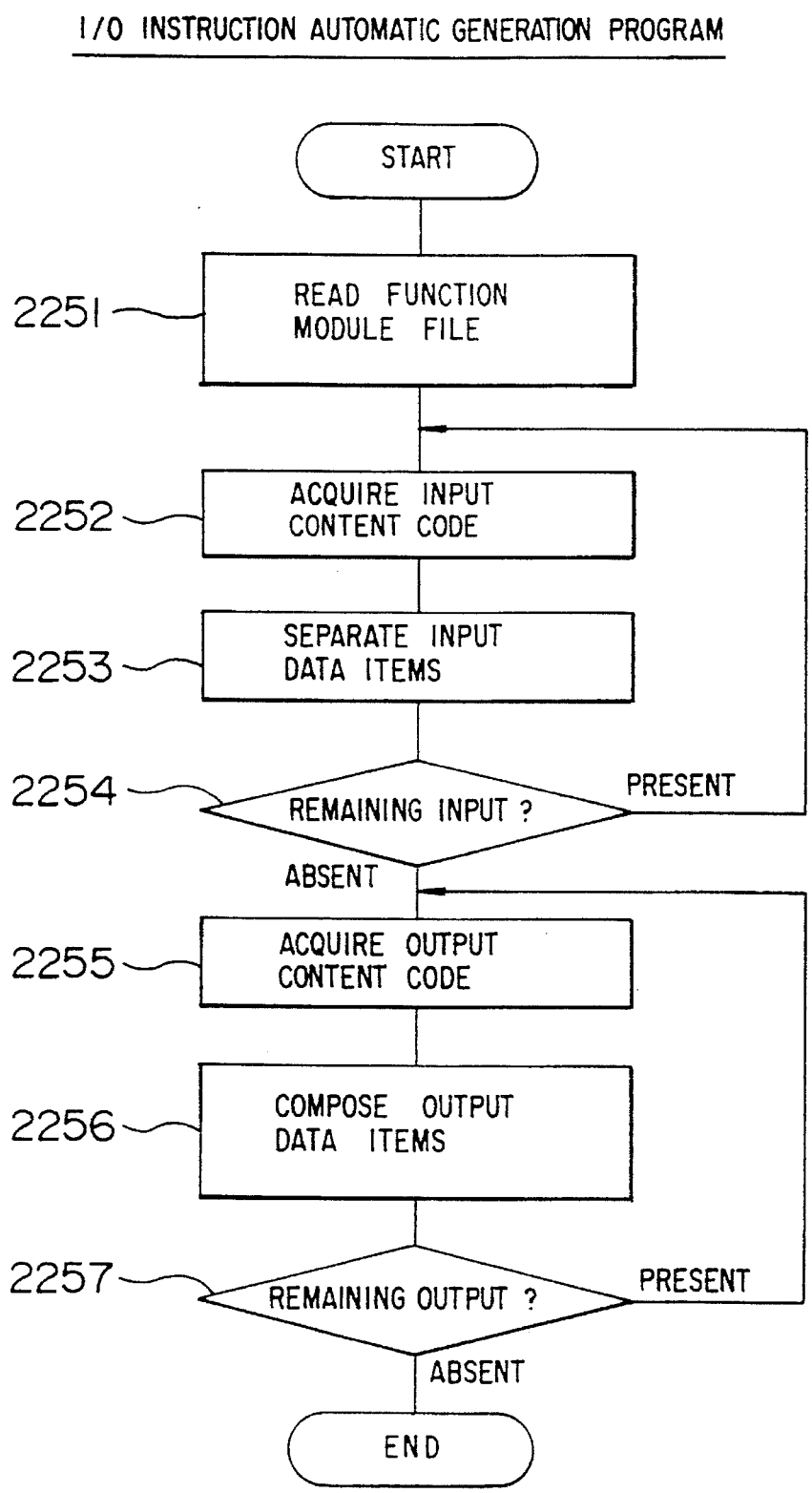
FIG. 41 is a flowchart showing the processing procedure of an automatic I/O instruction generation program of FIG. 17.

FIG. 41 is a flowchart showing the processing procedure of the I/O instruction automatic generation program 2124 of FIG. 17.

This program 2124 first reads the function module file 2133 (step 2251) to attain data of a function module from the file 2133 so as to sequentially acquire as input content code (step 2252), thereby executing a disassemble processing on the data items to separate data items belonging to the content code (step 2253)j. The processing is accomplished for all data items of the respective input content codes (step 2254). Subsequently, for an output content code, the system executes processing to combine data items with associated output content codes in a similar manner (steps 2255 and 2256). Also in this case, the processing is accomplished for each data item of the respective output content codes (step 2257).

Through the processing procedure above, the I/O program source file 2186 is generated.

As above, in accordance with the embodiments of the present invention, software modules are separately produced in a concurrent fashion and integrity therebetween are automatically checked. This consequently increases productivity of programs through the overall program generation process. Moreover, since only I/O instructions of a program can be automatically generated, efficiency of the programming job is improved.

As many apparently widely different embodiments of the invention can be made without departing from the spirit and scope thereof, it is to be understood that the invention is not limited to the specific embodiments thereof except as defined in the appended claims.

APPENDIX A

PROGRAMMING SUPPORT METHOD AND SYSTEM

BACKGROUND OF THE INVENTION

1. Field of the Invention

The present invention relates to a programming method in which software modules are combined and separated when software modules are developed in a separate fashion, and in particular, to a programming support method and a programming support system in which each processing module is independently designed to generate programs so as to thereafter establish a module construction of the overall system.

2. Description of the prior Technology

According to the software development method of the prior technology, a module construction of the entire software system is first determined such that by use of the construction as a premise, internal processing of each software module is designed depending on an order of module operations, thereby achieving the programming of the modules.

In consequence, if a portion is left undetermined in the module construction of the overall system software, the design and development of the respective software modules cannot be started. Furthermore, when changes take place during the software module design and development, the module construction of the entire software system is influenced by the changes. This may require modifications of software modules already completely developed in some cases.

Consequently, there has been employed a method of programming the respective software modules in a sequence depending on a flow of an initiation control thereof from the upstream to the downstream or vice versa of the flow in which a modification of a software module, if any, may influence the upstream or downstream software module. According to this method, the program creation cannot be accomplished by independently and concurrently designing the respective software modules.

By the way, a device of this kind concerning the prior technology has been described, for example, in the JP-A-61-208540.

In accordance with the prior technology above, the program design has been conducted in a top-down method. Namely, the overall system construction is first determined so as to achieve the module decision on the premise of the software construction, thereby sequentially producing programs depending on the control flow.

In consequence, in a distributed computer system, it has been difficult to achieve the software design and development for each module in an independent and concurrent fashion and hence the software productivity has not been easily increased.

SUMMARY OF THE INVENTION

It is therefore an object of the present invention to provide a programming method in which the respective software modules are independently and concurrently designed and developed. The module configuration of the entire software system is updated each time any software module is created so as to design and to develop the software modules in a bottom-up fashion to improve the software productivity, thereby removing the problems of the prior technology.

In order to achieve the object above, in the programming method in accordance with the present invention to constitute a distributed software system with a plurality of software modules combined with each other through an exchange of message data, each time a software module for which input output data items are determined is created, message data between the software module and the software modules beforehand generated is checked to examine the integrity of the content of the message data. The integrity is checked by referring to a known relationship between a software module producing the message data and a software module utilizing the message data. Thereafter the software module combining or separating operation is achieved to construct a distributed software system. The method is characterized in that the number of message data items and the number of software modules constituting the overall distributed software system can be arbitrarily adjusted.

Furthermore, in accordance with the present invention, when combining the software modules, of the output data of the software modules before combining, output data not to be transmitted to a processor or a processing apparatus other than processing apparatuses in which the software modules after combining are stored are registered as a broadcast suppress code table. Thereafter, at an execution of a program constituted with software modules after combining, only a self reception processing is conducted for the registered output data.

Moreover, according to the present invention, when constituting a program by combining the software modules, an input processing module, an operation processing module, and an output processing module of a software module program before combining are collected to form an input processing module, an operation processing module, and an output processing module of a program code.

In accordance with the present invention, in the case where an inclusion relationship is found when a content of a message data is referenced, the pertinent data items can be combined with each other.

That is, since the combined message data includes the contents before combining and the input/output data of the software modules are guaranteed, the number of message data is reduced and the number of modules is kept unchanged in the overall system.

Moreover, from the inclusion relationship, message data may be separated. By setting either one of the separated message data items to be an individual item or by combining separated message data items, the input/output data can be preserved for the software modules. In consequence, the number of message data is increased and the number of modules is kept unchanged in the overall system.

Furthermore, from relationships between creation and utilization of message data, the pertinent software modules can be combined with each other.

Namely, in the case where message data is produced only by one software module and is used only by one software module, the data generating and utilizing modules can be combined into a software module.

In this case, since the message data is deleted, the number of message data and the number of software modules are decreased.

In addition, when a message data item is used by a plurality of software modules, these modules can be combined with each other.

As a result, the number of message data is kept unchanged and the number of software modules is decreased.

Moreover, when combined software modules are desired to be separated into the original software modules, a software module separation is achieved.

As described above, through combining and separating software modules and message data constituting the system, the entire program construction can be arbitrarily changed.

BRIEF DESCRIPTION OF THE DRAWINGS

These and other objects and advantages of the present invention will become apparent by reference to the following description and accompanying drawings wherein:

FIG. 1 is a processing flowchart of a module construction checking program in a first embodiment according to the present invention;

FIG. 2 is a functional constitution diagram of a program design support system in the first embodiment according to the present invention;

FIG. 3 Is an explanatory diagram useful to explain the structure of a content code table of FIG. 2;

FIG. 4 is a schematic diagram showing the structure of a module table of FIG. 2;

FIG. 5 is an explanatory diagram for explaining the configuration of a data item table of FIG. 2;

FIG. 6 is an explanatory diagram for explaining the configuration of a combining historical table of FIG. 2;

FIG. 7 is a processing flowchart of a definition input program of FIG. 2;

FIG. 8 is a processing flowchart of a module structure updating program of FIG. 2;

FIG. 9 is a functional construction diagram of the program design support system of a second embodiment according to the present invention;

FIG. 10 is an explanatory diagram useful to explain the constitution of the broadcast suppress content code table of FIG. 9;

FIG. 11 is an explanatory diagram showing a module combining operation at a program execution in the second embodiment according to the present invention;

FIG. 12 is a processing flowchart of the broadcast suppress program of FIG. 9;

FIG. 13 is a flowchart showing the processing of the interface of FIG. 9;

FIG. 14A and 14B are explanatory diagrams useful to explain a program combining operation in the second embodiment according to the present invention; and FIG. 15 is a processing flowchart of the module combining program of FIG. 9.

DESCRIPTION OF THE PREFERRED EMBODIMENTS

Referring now to the drawings, a description will be given of an embodiment according to the present invention.

FIG. 2 is a functional configuration diagram of a program design support system of a first embodiment according to the present invention.

The system of FIG. 2 includes a processor or a processing apparatus 1, a content code table 2, a module table 3, a data item table 4, a combining historical table 5, a definition input program storing area 6, a module construction check program storing area 7, a module construction updating program storing area 8, and a processing module storing area 9.

The processing module storing area 9 is disposed to store therein a module processing procedure program.

Incidentally, although not shown in FIG. 2, the processor 1 is connected to a cathode-ray tube (CRT).

FIG. 3 is an explanatory diagram for explaining the structure of the content code table 2 of FIG. 2.

The configuration of FIG. 3 comprises a content code 21, a data item count 22, and a data item name 23.

The content code 21 designates a content of a message data to be communicated by the software modules for identifying the data item names 23 of which the number is specified by the data item count 22. Moreover, this format is repeatedly employed for each content code 21.

FIG. 4 is an explanatory diagram for explaining the constitution of the module table 3 of FIG. 2. This format constitution is repeatedly specified for each module.

The structure of FIG. 4 comprises an input content code count 31, an input content code 32, an output content code count 33, an output content code 34, an input data item count 35, an input data item name 36, an output data item count 37, an output data item name 38, a module name 39, a processing module storing address 40, and a processing module length 41.

In this embodiment, a software module denoted by the module name 39 includes a processing module which has a processing module length of 41 bytes and which is stored at an address designated by the processing module storing address 40.

Furthermore, the indispensable input content code 32 for a software module is only the input content code count 31. For the output, there exist the output content codes 34 of which the number is designated by the output content code count 33. The content of the input content code 32 and the output content code 34 denote a data specification of message data.

The premise of the software module processing is determined by a group of data respectively represented with the input data item names 36 of which the number is specified by the input data item count 35 and with the output data item names 38 of which the number is specified by the output data item count 37.

FIG. 5 is an explanatory diagram useful to explain the structure of the data item table 4 of FIG. 2.

The data item table 4 of this embodiment indicates the content of each data item name 23 of the content code table 2 of FIG. 3 and comprises a data unit length 42, a number of elements in an array or an array element count 43, a data code 44, and a sign presence/absence 45 each specifying the attribute of the data item name 23. These items are repeatedly specified for each data item name 23.

FIG. 6 is an explanatory diagram for explaining the construction of the combining historical table 5 of FIG. 2.

The constitution of FIG. 6 includes a module name before combining 51 and a module name after combining 52.

In this embodiment, the module name before combining 51 and the module name after combining 52 are treated in a pair so as to save the pertinent data of the module table 3 associated with the module before combining and to restore the state of the module before combining by releasing the combined state.

FIG. 7 shows a processing flowchart of the definition input program in the definition input program storing area 6 of FIG. 2.

In this embodiment, when an input/output data in a software module is to be defined, the system searches for a content code 21 including the input and output data item names 36 and 38 supplied in conformity with the module unit format of the module table 3 (step 701).

More concretely, by using as key each input data item name 36 of FIG. 4, a retrieval is conducted on the content code table 2 of FIG. 3.

As a result, if an item for which a matching condition of the key is not found, a new content code 21 is determined. The code 21 is paired with a data item name 23 belonging thereto so as to produce data to be registered to the content code table 2 (step 702).

Furthermore, if the data item name 23 is missing in the data item table 4 of FIG. 5 (step 703), a set including the data item name 23, the data unit length 42, the array element count 43, the data code 44, and the code presence/absence 45 supplied as definition inputs are registered in a group to the data item table 4 (step 704).

Subsequently, based on the data item names 23 and input and output data item names 36 and 38 associated with the content code 21, a rationality check is conducted for the inclusion relationship (step 705). By the way, the rationality check comprises a check to determine whether or not the input and output data item names 36 and 38 are included in the data item names 23 belonging to the content code 21 and a check to determine whether or not consistency exists between the attributes of the data unit length 42, the array element count 43, the data code 44, and the code presence/absence 45.

If the rationality check results in OK, the content code table 2, the module table 3, and the data item table 4 are updated (step 706).

FIG. 1 is a processing flowchart of the module construction checking program 7 of FIG. 2.

In this embodiment, by use of the content code table 2, the data item names 23 belonging to the content code 21 is mutually compared with the content code 21 so as to check the inclusion relationship (step 101).

For example, assuming the data item names 23 to be elements of a set and the content code 21 to be a name of the set, if a relationship of a union of sets holds, these content codes 21 may possibly be combined into a content code of the union of sets.

In addition, between the content codes 21, if a relationship of a subset comprising data item names 23 as elements thereof is found, the content codes to form the subset may be combined into either one of the content codes.

In this fashion, if there exists a combining possibility (step 102), the content of the combining possibility is displayed on the CRT, not shown (step 103).

Next, a check is made for separating the content code (step 104).

That is, in the case where a relationship of a union of sets holds between sets including data item names 23 as elements thereof between content codes 21, a separating operation can be conducted to obtain a union of subsets.

The content of the separation possibility is displayed on the CRT (steps 105 and 106).

Thereafter, possibility of a module combining is examined (step 107).

In the module table 3, if all output content codes 34 of a software module are identical to all input content codes 34 of another software module, these software modules may possibly be combined with each other.

Moreover, the possibility of the software module combining is displayed on the CRT (steps 108 and 109).

Next, the system checks for a release of a module combining specification (step 110).

By the way, a module combining release, namely, a separation of software modules means that a combined software module is restored to the original module.

Consequently, when the module combining may possibly be released (step 111), the content of the combining historical table 5 is displayed on the CRT (step 112).

FIG. 8 is a processing flowchart of the module construction updating program in the storing area 8 of FIG. 2.

In this embodiment, when the construction of the created software module is updated, a check is first made to determine whether the content code 21 is to be combined or to be separated (step 801).

Namely, if the content code 21 is to be processed, the system determines to effect the combining or the separation (step 802) so as to update the content code table 2 depending on the content of the result (steps 803 and 804).

When the processing object is a software module (step 801) and the combining is specified (step 805), the module table 3 is updated (step 807) and then the content of the software module before combining is saved into the combining historical table 5 (step 808).

Moreover, for the separating or the release of combining specification (step 805), the pertinent data is moved from the combining historical table 5 into the module table 3 to restore the original module (step 806).

FIG. 9 is a functional configuration diagram of the program design support system in the second embodiment according to the present invention.

The system of FIG. 9 includes a broadcast suppress program storing area 10, an interface 11 for communicating data with other computers, a module combining program storing area 12, a broadcast suppress content code table 13, a transmission path 14, and other tables and program storing areas, which are identical to those of the first embodiment shown in FIG. 2.

In this embodiment, when a software module combining condition is satisfied in the steps 107 to 109 of the flowchart of FIG. 1, the module combining is achieved at a program execution so as to combine modules to produce a program.

FIG. 10 is an explanatory diagram for explaining the constitution of the broadcast suppress content code table 13 of FIG. 9.

In this embodiment, the broadcast suppress content code table 13 is used, in the case where a content code produced from a software module is not delivered to other computers so as to achieve a selfreception processing, to store therein the content code as a broadcast suppress content code 61. When a data item of the content code registered to the broadcast suppress content code table 13 is issued, the interface 11 is instructed to accomplish the self-reception processing.

FIG. 11 is an explanatory diagram useful to explain a module combining operation at a program execution in the second embodiment according to the present invention.

This embodiment includes a module before combining P 71, which receives as an input thereto data of a content code S 73 so as to produce a content code m 75 and a content code n 76. Moreover, the system comprises a module before combining Q 72, which receives as input thereto data items of the content code n 75 and the content code m 76 so as to create a content code t 74.

In this operation, when a module combining condition holds in the steps 107 to 109 of FIG. 1, the processing is achieved at a program execution such that when the content code n 75 and the content code m 76 are registered as the broadcast suppress codes 61, there is produced a module after combining PQ 70 which receives, after the combining operation, as an input thereto the content code s 73 so as to generate the content code t 74.

FIG. 12 is a processing flowchart of the broadcast suppress program in the storing area 10 of FIG. 9.

According to this embodiment, when a module combining condition holds in the steps 107 to 109 of FIG. 1, the broadcast suppress program 10 conducts a retrieval on the broadcast suppress content code table 13 by using as a key the content code of the data to be broadcasted or transmitted (step 1201).

As a result, if the pertinent content code has not been registered to the table 13, the interface 11 is instructed to send the content code via the transmission path 14 to other computers (step 1203).

If the content code is found, the transmission to the external computers is not conducted.

FIG. 13 is a processing flowchart of the interface 11.

In this embodiment, if the broadcast suppress program in the storing area 10 instructs a transmission of data to be sent from the interface 11 (step 1301 and 1302), the data is transmitted via the transmission route 14 to the external devices (step 1303).

Moreover, if the transmission is not instructed, the data transmission to the external devices is not conducted.

Thereafter, the pertinent data is processed as a self-reception item of the own system (step 1304).

Through the operation above, the module before combining P 71 of FIG. 11 issues the content code m 75 and the content code n 76. These codes are not sent to the other computers and are received only by the module before combining Q 72.

In consequence, the other computers only recognizes the module PQ 71 after combining, which receives the content code s 73 and which produces the content code t 74. Namely, the modules before combining P 71 and Q 72 are not recognized.

FIG. 14 is an explanatory diagram for explaining the program combining in the second embodiment according to the present invention, whereas FIG. 15 is a processing flowchart of the module combining program of FIG. 9.

FIG. 14A shows module inclusion relationships before and after a module combining.

In this case, a module before combining A 82 receives data of a content code P 84 to produce a content code q 85; whereas a module before combining B 83 receives data of the content code P 84 to create a content code r 86.

By combining these software modules, a module after combining AB 81 receives data of the content code P 84 so as to create the content code q 85 and the content code r 86.

Furthermore, FIG. 14B shows a program example before and after a software module combining in which the modules before combining A 82 and B 83 of FIG. 14A are combined to produce a program.

When software modules of FIG. 14A are combined to form a program, an input module A 92, a module A processing 93, and an output module A 94 constituting a program 98 of module A before combining are processed by the module combining program so as to be combined as an input module 95, a module B processing 96, and an output module B 97 constituting a program 97 of module B before combining.

That is, as shown in FIG. 15, a combining of instruction portions of the input modules (step 1501), a combining of the processing modules (step 1502), and a combining of the output modules (step 1503) are respectively conducted to produce a program of module AB after combining in a simple constitution.

In accordance with the present invention, each software module for which input/output data items are determined is independently designed for the processing thereof such that the construction of the overall system can be updated while the programming job is being achieved. Consequently, the software modules can be concurrently produced and the software productivity is increased.

While particular embodiments of the invention have been shown an described, it will be obvious to those skilled in the art that various changes and modifications may be made without departing from the present invention in its broader aspects.

We claim:

1. A program processing method in a distributed processing system including a transmission medium and a plurality of processors connected thereto in which a sequence of processing is executed in a distributed manner and in which programs executing the sequence of processing are distributed to and stored in said plurality of processors, each of said processors transmits messages to said transmission medium to communicate with other processors, each of the messages including an information field and a content code field which identifies the contents of a corresponding information field, said method comprising the steps of:

reading a program in which program codes are described;

detecting an input processing section and an output processing section in said read program;

setting input auxiliary variables corresponding to input variables used in said input processing section of said read program and output auxiliary variables corresponding to output variables used in said output processing section of said read program;

rewriting said input processing section of said read program such that values of said input auxiliary variables are substituted for said input variables and said output processing section of said read program such that values of said output auxiliary variables are substituted for said output variables;

producing auxiliary input and output processing sections for said input and output auxiliary variables based on said input and output processing sections, respectively, and arranging said auxiliary input processing section before other processing sections of said read program and said auxiliary output processing section after the other processing sections of said read program thereof to produce a new program; and storing said new program in one of said processors so that said one of said processors accepts messages transmitted through said transmission medium when the content field code in the message indicates a predetermined content code, and that said new program starts executing when data of said input variables is entirely accepted into said one of said processors.

2. A program processing method according to claim 1, wherein said setting step comprises the steps of:

searching the read program for variables; and setting one variable which is not used in said read program, as each of said input and output variables in accordance with the searching result.

3. A program processing method according to claim 1, wherein said setting step comprises the step of setting said input and output auxiliary variables in accordance with a predetermined rule.

4. A program processing method according to claim 1, further comprising the step of executing the new program by the processors based on the information as input information when information necessary for execution of the new program is prepared.

5. A program processing method according to claim 1, wherein said storing step further comprises the step of converting a format of said new program into that of an execution module executable by said processors.

6. A program processing method according to claim 5, wherein said converting step comprises the steps of:

compiling said auxiliary input and output processing sections and the other processing sections individually to produce an object module for each processing section; and linking said object modules to produce said execution module.

7. A program processing apparatus in a distributed processing system including a transmission medium and a plurality of processors connected thereto in which a sequence of processing is executed in a distributed manner and in which programs executing the sequence of processing are distributed to and stored in said plurality of processors, each of said processors transmits messages to said transmission medium to communicate with other processors, each of the messages including an information field and a content code field which identifies the contents of a corresponding information field, said program processing apparatus comprising:

means for reading a program in which program codes are described;

means for detecting an input processing section and an output processing section in said read program;

means for setting input auxiliary variables corresponding to input variables used in said input processing section of said read program and output auxiliary variables corresponding to output variables used in said output processing section of said read program;

means for rewriting said input processing section of said read program such that values of said input auxiliary variables are substituted for said input variables and said output processing section of said read program such that values of said output variables are substituted for said output auxiliary variables;

means for producing auxiliary input and output processing sections for said input and output auxiliary variables based on said input and output processing sections, respectively, and arranging said auxiliary processing section before other processing sections of said read program and said auxiliary output processing section after the other processing section of said read program thereof to produce a new program; and means for storing said new program in one of said processors so that said one of said processors accepts messages transmitted through said transmission medium when the content field code in the message indicates a predetermined content code, and that said new program starts executing when data of said input variables is entirely accepted into said one of said processors.

8. A program processing apparatus according to claim 7, wherein said means for setting input auxiliary variables and output auxiliary variables includes:

means for searching said read program for variables; and means for setting one variable which is not used in said read program as each of said input and output variables in accordance with the said searching results.

9. A program processing apparatus according to claim 7, wherein said means for setting input auxiliary variables and output auxiliary variables includes means for setting said input and output auxiliary variables in accordance with a predetermined rule.

10. A program processing apparatus according to claim 7, wherein said means for storing said new program includes means for converting a format of said new program into that of an execution module executable by said processors.

11. A program processing apparatus according to claim 10, wherein said means for converting a format of said new program includes:

means for compiling said auxiliary input and output processing sections and said other processing sections individually to produce an object module for each processing section; and means for linking said object modules to produce said execution modules.

12. A program processing method according to claim 4, wherein the information communicated to said transmission medium is assigned with a content code denoting contents of the information, said method further comprising:

storing, in said processor, content codes of information necessary for execution of said new program described in conformity with a predetermined program code;

judging, by said processor, to determine, when said processor inputs the information from said transmission medium, whether or not said information is necessary for execution of said program based on said content codes thus stored;

driving, by said processor, said program for execution of said processing when said information necessary for execution of said program is entirely received; and assigning, by said processor a content code regarding information resulting from execution of said program and transmitting said information to said transmission medium, said content code indicating contents of said information.

* * * * *